(12) United States Patent
Østergaard et al.

(10) Patent No.: US 8,218,154 B2
(45) Date of Patent: Jul. 10, 2012

(54) SYSTEM AND A METHOD OF DETERMINING A POSITION OF A SCATTERING/REFLECTING ELEMENT ON THE SURFACE OF A RADIATION TRANSMISSIVE ELEMENT

(75) Inventors: Jens Wagenblast Stubbe Østergaard, Roskilde (DK); Jonas Ove Philip Eliasson, Valby (DK); Niels Agersnap Larsen, Lyngby (DK)

(73) Assignee: FlatFrog Laboratories AB, Lund (SE)

( * ) Notice: Subject to any disclaimer, the term of this patent is extended or adjusted under 35 U.S.C. 154(b) by 624 days.

(21) Appl. No.: 12/225,804

(22) PCT Filed: Mar. 29, 2007

(86) PCT No.: PCT/DK2007/000156
§ 371 (c)(1),
(2), (4) Date: May 5, 2009

(87) PCT Pub. No.: WO2007/112742
PCT Pub. Date: Oct. 11, 2007

(65) Prior Publication Data
US 2009/0273794 A1    Nov. 5, 2009

Related U.S. Application Data

(60) Provisional application No. 60/787,164, filed on Mar. 30, 2006.

(51) Int. Cl.
*G01B 11/14* (2006.01)
*G01N 23/00* (2006.01)

(52) U.S. Cl. ..... 356/614; 356/625; 250/221; 250/222.1; 250/393

(58) Field of Classification Search .......... 356/610–614, 356/625; 250/221, 222.1; 435/173, 157, 435/175, 176
See application file for complete search history.

(56) References Cited

U.S. PATENT DOCUMENTS

| | | | |
|---|---|---|---|
| 5,483,261 A * | 1/1996 | Yasutake | 345/173 |
| 5,525,764 A | 6/1996 | Junkins et al. | |
| 5,775,792 A | 7/1998 | Wiese | |
| 6,067,079 A * | 5/2000 | Shieh | 345/173 |
| 6,504,143 B2 | 1/2003 | Koops et al. | |
| 6,648,485 B1 | 11/2003 | Colgan et al. | |
| 6,806,871 B1 | 10/2004 | Yasue | |

(Continued)

FOREIGN PATENT DOCUMENTS
EP    1 512 989    3/2005
(Continued)

OTHER PUBLICATIONS

"The Laser Wall" http://web.media.mit.edu/~joep/SpectrumWeb/captions/Laser.html , Published 1997.

*Primary Examiner* — Sang Nguyen
(74) *Attorney, Agent, or Firm* — Harness, Dickey & Pierce, P.L.C.

(57) ABSTRACT

A system and a method of determining a position of a scattering/reflecting element on a surface of a radiation transmissive element adapted to transport scattered/reflected radiation toward one or more detectors. Radiation having different characteristics or properties is transmitted to different areas of the surface whereby the position of the touch may be determined from the radiation scattered/reflected.

36 Claims, 10 Drawing Sheets

U.S. PATENT DOCUMENTS

| | | | |
|---|---|---|---|
| 7,084,859 B1 * | 8/2006 | Pryor | 345/173 |
| 7,435,940 B2 * | 10/2008 | Eliasson et al. | 250/221 |
| 7,465,914 B2 * | 12/2008 | Eliasson et al. | 250/221 |
| 7,653,883 B2 * | 1/2010 | Hotelling et al. | 715/863 |
| 7,859,519 B2 * | 12/2010 | Tulbert | 345/173 |
| 7,995,039 B2 * | 8/2011 | Eliasson et al. | 345/173 |
| 2001/0030642 A1 * | 10/2001 | Sullivan et al. | 345/157 |
| 2003/0034439 A1 | 2/2003 | Reime et al. | |
| 2003/0137494 A1 | 7/2003 | Tulbert | |
| 2004/0252091 A1 | 12/2004 | Ma et al. | |
| 2005/0041013 A1 | 2/2005 | Tanaka | |
| 2005/0073508 A1 | 4/2005 | Pittel et al. | |

FOREIGN PATENT DOCUMENTS

| | | |
|---|---|---|
| KR | 2001-0060254 | 7/2001 |
| WO | WO 2004/081502 | 9/2004 |
| WO | WO 2004/081956 | 9/2004 |
| WO | WO 2005/026938 | 3/2005 |

* cited by examiner

SYSTEM AND A METHOD OF DETERMINING A POSITION OF A SCATTERING/REFLECTING ELEMENT ON THE SURFACE OF A RADIATION TRANSMISSIVE ELEMENT

CROSS-REFERENCE TO RELATED APPLICATION(S)

This application is the national phase under 35 U.S.C. §371 of International Application No. PCT/DK2007/000156, which has an International filing date of Mar. 29, 2007, and claims priority to U.S. provisional application No. 60/787,164, which was filed on Mar. 30, 2006. International Application No. PCF/DK2007/000156 designates the United States. The entire contents of each of the above-mentioned applications are incorporated herein by reference.

BACKGROUND OF THE INVENTION

The present invention relates to a system and a method of determining a position of a scattering/reflecting element on a surface of a radiation transmissive element, such as on a touch pad.

A number of prior art references relate to this type of technology, such as U.S. Pat. No. 6,504,143, US 20040252091, 2003034439, 20050041013, and 20050073508, WO04/081502 and 04/081956 as well as in KR1060254.

A particular aspect and embodiment of the invention relate to large format displays which are becoming cheaper at an astonishing rate. This has led to a rapid growth in display sizes for different applications such as televisions, monitors etc. and will soon open the market for novel display applications.

Especially monitors are poised to grow and many designers have conceptualized workplaces where monitors and table merge similar to classic drawing tables used by designers and engineers before the digital era. A key property for these workplaces is interactivity and preferably multiple inputs.

Game tables both for home use and for the gaming industry is a similar concept that is on the verge of taking of.

No known technology has provided multiple inputs at a cost comparable to what will be accepted for volume applications.

The present aspect and embodiment do exactly this and do it without impairing the display performance.

Scanning beam above the surface of the display waveguide has been contemplated and MIT has made their laserwall concept public in 1997.

The Laserwall use standard rangefinder technology to determine multiple inputs position. The limiting factor for the design is that the beam once interrupted will not see any objects that are behind the first beam interrupting object. In the concept this shadow interrupt phenomenon is dealt with by using two rangefinders so objects in shadow from one rangefinder will be picked up by the other rangefinder.

According to example embodiments, the determining means may be a processor, such as, described in U.S. Patent Application Publication No. 2003/0137494. For example, the determining means may be a processor configured to determine the position of a scattering/reflecting object based on signals from radiation detectors. In another example, the determining means may be processor in the form of a personal computer configured to execute image analysis software to generate output signals corresponding to user contact with a contact surface of a panel. The determining means may also be a touch controller, which may be implemented in the form of a processor, such as, described in U.S. Patent Application Publication No. 2003/0137494.

In the shadowed areas the resolution will be poorer because there is only one rangefinder available for position detection and this may be more distant. Also position detection cannot be done at all in areas where intersections of shadows occur. Two contaminations right in front of each rangefinder will make the system entirely inoperable. The Laserwall is therefore not a true multiple inputs touch screen. Further the rangefinder will experience touch confirmation problems similar to those associated with classic IR interrupt because the beam may be interrupted prior to actual touch occurs. In the Laserwall concept they have opted for the same approach as for classic IR interrupt where algorithms filter out very brief touches and the optics of both emitter and sensors are designed to irradiate and detect in the closest possible proximity to the touch surface.

SUMMARY

In a first aspect, the invention relates to a system for determining a position of a scattering/reflecting element, the system comprising:
  a radiation transmissive element, which preferably is solid, having a first surface adapted to be engaged by the scattering/reflecting element and a second surface opposite to the first surface,
  a radiation provider adapted to provide radiation to or at the first surface in order for the scattering/reflecting element to be able to scatter/reflect radiation into the radiation transmissive element at the position on the first surface,
  one or more detectors for detecting radiation scattered/reflected, at the position at the first surface, into the radiation transmissive element (by the scattering/reflecting element) and guided by the radiation transmissive element toward the detector(s) and for outputting one or more corresponding signals,
  means for determining the position on the basis of the signal(s) from the detector(s),
wherein:
  the radiation provider is adapted to provide radiation with different properties/characteristics to different parts/areas of the first surface, at least one area of the first surface receiving radiation having at least two of the different properties/characteristics, and
  the determining means is adapted to determine the position on the basis of the properties/characteristics of the radiation detected by the detector(s).

The advantage of this invention is that the position may be determined at any position of the radiation transmissive means in that the information required to determine the position is carried by the scattered/reflected radiation guided by the radiation transmissive element.

Thus, the detector or detectors may be very simple detectors, which need not be angle sensitive but may e.g. be sensitive to only the intensity/wavelength of the incident radiation. In this manner, very fast detectors may be used, whereby the properties/characteristics of the radiation may be a variation so fast that the user will not be able to discern these, when viewing the displayed image. In addition, very fast detection intervals suitable for tracking fast movements or fast touches may be obtained.

In the present context, the position is that from which the radiation is reflected or scattered into the radiation transmissive element. The emitted/provided radiation may either be transmitted over the first surface of the radiation transmissive element and scattered into the radiation transmissive element by the scattering/reflecting element, or it may be transmitted in or be guided by the radiation transmissive element, impinge from inside this element on the first surface, whereby the radiation in fact will extend slightly outside the first surface, where an engaging or touching scattering/reflecting element will reflect/scatter the radiation back into the radiation transmitting element.

Preferably, the radiation transmissive element is adapted to guide the radiation from the touch position to the detector(s), and optionally also the radiation from the radiation emitter, by internal reflection, preferably total internal reflection (TIR). The radiation from the radiation emitter will then propagate through the element until it is reflected/scattered, where after it will travel in many or all directions within the radiation transmissive element including towards the detector(s).

The detectors may be provided directly at a surface or edge of the radiation transmissive element, or means may be provided for coupling the radiation out of the radiation transmissive element and toward the detectors.

In the present context, the scattering/reflecting element may be any element able to scatter or reflect radiation to any suitable degree. Normal elements of this type will be fingers, palms, edges of credit cards, an end of a stylus, a nail, the end of a pen, or any other suitable object. As a matter of fact, both the extent thereof when engaging the surface but also the colour thereof and scattering properties may be detected by the detectors, and information relating thereto may be used for a number of purposes.

Different properties or characteristics of the radiation are used. Such properties or characteristics may be a particular colour/wavelength/polarization, or a predetermined alteration thereof, as well as an amplitude modulation (such as a change in amplitude or intensity or a modulation frequency), a particular point in time or a time interval of operation (radiation emission), phase modulation (modulation frequency or phase), or any known digital modulation technique, such as pulse modulation at one or more predetermined frequencies.

A particular property or characteristic is one where the radiation from the radiation provider is guided in the radiation transmissive element by internal reflection (preferably TIR). In this situation, this radiation may be controlled as to the angle between the direction of the radiation and the first surface, the so-called z-angle. When the radiation travelling from the radiation emitter toward the point of touch has a specific angle (or is within a relatively narrow angle interval) with respect to the plane of the first surface the radiation will impinge on the first surface with fixed intervals (between reflections against the second surface) in a direction toward or away from the emitter. Thus, particular areas of the first surface, e.g. positioned in a pattern of concentric rings (or parts thereof) around the radiation emitter, will receive the radiation. In this manner, different angles will provide different patterns of concentric rings around the individual radiation provider/emitter and with a pitch defined by the z-angle.

Naturally, an amplitude modulation will be different from a change in wavelength, but two amplitude modulations will also be different, if they are performed at two different points in time, have different phases, or have different modulation frequencies.

In a particularly interesting embodiment, the radiation emitter comprises means for providing at least two scanning beams directing radiation toward the first surface from different locations. Hence, the detector(s) is/are positioned so as to be able to determine one or more points in time where the scanning beams emit radiation toward the detector(s), and wherein the determining means are adapted to determine the position also on the basis of the point(s) in time.

In a preferred embodiment of this type, two, three or more units with an emitter able to deliver a collimated beam which is directed towards an optical element that can scan the beam in an angle span sufficient to cover the touch pad waveguide where after the beam is directed to an optical element that split the beam into a broad collimated beam and then onto an optical element that control the zeta angle and then the beam is directed into the waveguide where objects in optical contact with the waveguide able to attenuate the beam will scatter or reflect some radiant energy through the waveguide towards one or more sensors attached to the waveguide. The position of the scanned beam is calculated based on when the beam impinges upon the attached sensors. The x,y direction out to a point of touch is calculated by timing when radiant energy from an attenuating touching object is received.

Position detection is then preferably done by correlating the registration of radiant energy related to two or more scanning beams from two or more scanning units.

In this preferred embodiment the emitter is a laser connected via fibre optics. Advantages are that the form format can be improved and that thermal managing can be simplified and that the opportunity to use a larger laser with higher output will increase system performance and a single laser with a shifter can supply irradiation to one, two, three or more beam controlling units. Alternatively one, two, three or more beam controlling units can use one or more lasers each. Alternatively to lasers the emitters can be LED's or any other suitable light source that can be collimated sufficiently.

The emitter is preferably directed towards a scanning optical element that can scan the beam in the necessary angle span. The scanning optical element can be a rotating mirror or alternatively a MOEMS unit, a liquid crystal or an opto-acoustic unit.

The beam is then split into a broad collimated beam to match the height of the waveguide by use of an optical element. This optical element can be based on diffractive or classic optics alike or in combination.

The broad collimated beam is then fed into an optical element that controls the zeta axis angle. This optical element may be based on gratings or Fresnel lenses or ordinary lenses.

The key objective of this embodiment is to create a line of irradiation on the surface of the waveguide which would be impossible if the beam was sent in as a collimated beam because this would lead to formation of concentric ripples across the waveguide. These ripples would constitute a grid of intersections where touch detection is feasible. A separate purpose of controlling the irradiation in zeta as well as in x,y is that different common contaminants such as water and grease have lower refractive indices than fingers and certainly than special input tools where high refractive index materials can be chosen. If the zeta axis angles are higher than the critical angle between the waveguide surface and the contaminant then the contaminant will not attenuate the irradiation whereas a finger or special tool may attenuate the irradiation provided that the irradiation zeta angles are lower than the critical angles between the finger and the waveguide. For special purpose touch screens the zeta angles and the refractive index of the waveguide can be controlled such that human tissue will together with the waveguide will form a critical angle that is lower than 90 degrees whereas special high refractive index tools will be able to attenuate the irradiation and deflect radiation in angles above the critical angle formed between the waveguide and human tissue.

Also, a property/characteristic may be a mix of two or more of the above properties/characteristics.

Consequently, groups of characteristics/properties may be defined which each has a number of members none of which are members of other groups. As will be described further below, this facilitates the determination of further information relating to a touch or the tracking of additional touches and the like.

Preferably, the properties/characteristics of the radiation are selected so that they may be easily discerned from each other, in order to facilitate easy detection and/or signal treatment. Radiation with different characteristics, such as different wavelengths, may be separated before detection (and detected separately), or the radiation may be detected and the properties/characteristics, such as modulation frequencies, may subsequently be derived from the output of the detector.

In the area in which a mix of properties/characteristics is present, the determination may be the same as that relating to areas in which no mix is present.

Having derived the properties/characteristics of the radiation received or detected, the pertaining area in which that or those particular property/ies and/or characteristic(s) are present (from radiation from one or more radiation emitters) may be determined. Preferably, the position of the radiation emitter(s) and the radiation characteristic(s) thereof are known in order to be able to determine the area in which each radiation emitter transmits radiation with the property/ies and/or characteristic(s) of that emitter.

Preferably, the radiation provider comprises a plurality of radiation providers/emitters each providing radiation to a predetermined part/area of the first surface and each being adapted to provide radiation with a predetermined property/characteristic or with a property/characteristic selected from a predetermined group of properties. In this situation, the determination may, as explained above, be performed on the basis of knowledge of the emitters/providers position or the areas or parts in which they emit radiation.

In one embodiment, the radiation provider is adapted to emit radiation into the radiation transmissive element and onto the first surface, and the radiation transmissive element is adapted to guide radiation from the radiation provider to the first surface. Thus, the radiation may, as explained above, be guided, such as using internal reflection or TIR, by the radiation transmissive element toward the first surface. The radiation may be emitted into the radiation transmissive element (preferably parallel to the first surface) either from an edge thereof or be coupled into the radiation transmissive element through the first or second surface, such as through a wedge or the like.

In another embodiment, the radiation provider comprises a plurality of radiation emitters each adapted to emit radiation through the second surface and (normally directly) onto the first surface, each radiation emitter or group of radiation emitters being controllable independently of other emitters or groups of emitters. Preferably the radiation emitters emit radiation as at least substantially parallel beams, which, at the first surface, are non-overlapping, slightly overlapping, or overlapping. Preferably each emitter may itself be controllable as to the intensity and/or wavelength emitted, or it may comprise an element which can control these parameters, such as when a monitor or screen overlays the emitters.

In this embodiment, the radiation provider may be adapted to control the radiation emitters or groups of radiation emitters to, sequentially in a predetermined order, emit radiation with a predetermined variation in wavelength or intensity, and wherein the determination means is adapted to determine the position on the basis of a wavelength/intensity variation and a point in time of detection of the variation. This may be a searching for a touch, in which individual areas are sequentially searched. In this manner, the same characteristics/properties may be used in each search in that they are separated in time.

In a particularly interesting embodiment, each radiation emitter comprises a means for altering radiation, all altering means receiving radiation from one or more radiation emitters providing radiation to a plurality of the altering means. Then, each radiation emitter could provide radiation to a plurality of altering means, no altering means receiving radiation from more than one radiation emitter, and wherein the properties of the radiation emitters may be controlled independently of radiation altering properties of the individual altering means.

In short, a back-lit display, where a set of backlight light providers launch radiation through the pixels which alter the properties of the radiation, such as selecting a colour or intensity thereof, may be used, where a property of the backlight radiation (such as an intensity thereof) may be varied by one or more radiation providers, which gives a variation of one property in a predetermined area, and another property may be varied by the pixels, whereby two variations are obtained. Naturally, the properties may be e.g. an intensity, if the two variations are separable, such as using different frequencies in the variation or different intensity variations.

In the following, a particularly interesting embodiment is described in more detail:

The general trend in LCD design is that photodiodes are making way as primary sources of backlighting. The most direct substitution of the widely used CCFL tubes are white LED's that are designed using blue-light emitting photodiodes with Phosphor. Like UV radiation generated inside CCFL's the short blue wavelengths generated by the LED excite the phosphor and the phosphor emits radiation across the visible spectrum and some way into the NIR and UV spectrum.

Modern LCD displays need pulsed backlight that can be scanned across the display such that the pixels are only backlighted when they are adapted to block the desired amount of light to create a desired image. This entails active matrix addressing of all backlight LED's and all liquid crystal pixels.

The birefringent material in liquid crystal pixels is not consistently birefringent across all wavelengths, so in consequence red, green and blue pixels are set in different torsion states in order for them to block a given percentage of the respectively red, green and blue spectrum contained in the backlight source. Outside the intended respectively red, green or blue spectrum the liquid crystal blocks less or more percentages of the spectrum contained in the backlight source.

The red, green and blue filters are not targeted to be efficient outside the visible spectrum so NIR and UV can in various degrees permeate the filters. Also, a growing number of displays are made with white pixel insertion because this lift the brightness of the display—and for white pixels the permeability of NIR radiation is also likely to be fine because these pixels are optimised to control blockage of visible light.

The combined effects of the blue phosphor white LED's NIR spectrum and liquid crystal pixels inability to be efficient outside a targeted part of the visible spectrum and the filters ditto inability of filtering away NIR allows a part of the NIR backlight to reach the upper surface. Any touching object will be able to scatter light inside the waveguide and any hovering object will be able to scatter light above the waveguide which can be picked up by sensors adapted to detect above the surface. For displays with AG the AG structures will allow some radiation reflected by hovering object to re enter the waveguide and reach one or more sensors. So in case a display employs AG it may be able to see hovering object without the assistance of sensor specially adapted to see above the display.

It is therefore possible to determine the position of both touching and hovering objects (objects not touching the first surface but being sufficiently close for radiation impinging on the first surface to be affected thereby). Provided the timing of backlight emission and liquid crystal modulation is known which is of course the case because the computer controlling the display emission is accessible for the touch controller, then the position of both touching and hovering objects can be accurately determined. Provided that sensors are adapted to see separately inside the waveguide and above the waveguide it is feasible to determine whether an object is touching or hovering.

An alternative detection principle could be to use detectors placed beneath the LCD. These detectors are already present because the thermal instability and great output variety in batches of LED's and their different ageing profiles makes it necessary to monitor the output from each LED in order to compensate for emission characteristics changes that would otherwise have adverse effects on the visual perception of the display quality. Having detectors beneath the LCD creates very short optical pathways and a natural ability to see radiation transverse through the waveguide but it also requires a secondary touch conformation principle.

Returning to the more general description, alternatively, all areas or more areas may be searched or analyzed simultaneously by providing more properties/characteristics, so that all areas again are provided with radiation with different properties/characteristics.

Also, in the second embodiment, the radiation provider may be adapted to control the emitters so as to provide, through the second surface and onto the first surface of the radiation transmissive element, radiation representing a predetermined image, and wherein the radiation provider is further adapted to alter the emission of one or more radiation emitters by addition or subtraction of a predetermined intensity or wavelength, the determining means being adapted to determine the position as a position in which the intensity or wavelength has been altered.

Thus, the radiation emitters may, in fact, be part of or actually be a monitor or display providing the image(s) through the radiation transmissive element. The radiation emitters may then provide the individual pixels of the image.

At the same time, the radiation from the radiation emitters may be reflected back into the radiation transmissive element by the scattering/reflecting element and may therefore be used for the position determination. However, in order to be able to discern the position of a touch, it is desired to provide the radiation, now also forming part of the image presented, with a varying or altered characteristic/property. Thus, predetermined parts of the image are altered.

However, in this particular situation, it may be preferred to select properties/characteristics altering the radiation of the image in a manner that is indiscernible or hardly discernible to the human eye. Such properties may be a slight change in wavelength or intensity of the radiation or a modulation either with an amplitude low enough for it not to be too visible or with a frequency so high or so low that the human eye will not notice. It should be remembered that the searching/analysis is also performed at parts of the surface in which no touch is present and which provide the image for the user to see. A too large alteration of the radiation in these areas might distort the image unnecessarily.

Consequently, the providing of the image will be one property/characteristic of the radiation, and the altering taking place will be another. Thus, again two properties or characteristics will be present, and they will be mixable in order to also be discernible from each other.

In this situation, the radiation provider may be adapted to sequentially alter the emission of different groups of emitters. As mentioned above, separating individual areas or radiation providers in time facilitates the use of fewer different characteristics. In this manner, the surface may be searched or analyzed (the radiation altered at those positions) along a bar travelling from one side to the other of the surface or by a particular searching algorithm where many or all areas of the surface are searched one by one.

In a particularly interesting embodiment, the determining means may be adapted to:
  determine a first position of a first scattering/reflecting element engaging the first surface and a second position of a second scattering/reflecting element engaging the first surface and to
  control the radiation provider to provide first radiation at or on the first position and second radiation at or on the second position, the first radiation having a first property/characteristic or a property/characteristic selected from a first group of properties/characteristics, and the second radiation having a second property/characteristic or a property/characteristic selected from a second group of properties/characteristics, the first and second properties/characteristics being different and the first and second groups of properties/characteristics having no property/characteristic in common, and
wherein the determining means is adapted to:
  track the first position on the basis of signals from the detector and relating to radiation having the first property/characteristic or radiation having a property/characteristic from the first group and
  track the second position on the basis of signals from the detector and relating to radiation having the second property/characteristic or radiation having a property/characteristic from the second group.

Thus, by providing radiation with different characteristics/properties to the areas of the two or more touches, the radiation scattered by one touch will not interfere detrimentally with the detection of the radiation from any other touch. Consequently, multiple touches may be detected, analyzed, or tracked simultaneously.

In the present context, tracking of a touch will mean the continuous or repetitive determination of the position thereof in order to ensure or detect movement thereof over the first surface. In addition, tracking may also be of the shape or other characteristics (such as colour) of the touch or touching object in order to determine changes therein.

As mentioned above, the present aspect of the invention facilitates the use of simple detection techniques and/or the use of very fast detection. Consequently, preferably the radiation provider is adapted to provide radiation with a property/characteristic which is a variation in the amplitude/wavelength of the radiation, the variation being at least 50 Hz, such as at least 200 Hz, preferably at least 500 Hz, such as at least 750 Hz, preferably at least 1 KHz, such as at least 5 KHz, preferably at least 10 KHz, such as at least 25 KHz, preferably at least 50 KHz.

Another aspect of the invention relates to a method for determining a position of a scattering/reflecting element, the method comprising:
  providing, from a radiation provider, radiation to or at a first surface of a radiation transmissive element having a first surface adapted to be engaged by the scattering/ reflecting element and a second surface opposite to the first surface, the scattering/reflecting element scattering/reflecting radiation, at the position, from the radiation provider into the radiation transmissive element at the position on the first surface, detecting radiation scattered/reflected by the scattering/ reflecting element and guided by the radiation transmissive element toward the detector(s) and providing one or more corresponding signals, determining the position on the basis of the signal(s), wherein:

the radiation providing step comprises providing radiation with different properties/characteristics to different parts/areas of the first surface and providing radiation having at least two of the different properties/characteristics to at least one area, and the determination step comprises determining the position on the basis of the properties/characteristics of the radiation detected.

Then, the radiation providing step may comprise each of a plurality of radiation emitters providing radiation to a predetermined part/area of the first surface and each providing radiation with a predetermined property/characteristic or with a property/characteristic selected from a predetermined group of properties.

As mentioned above, a particularly interesting embodiment is one wherein the radiation providing step comprises providing at least two scanning beams directing radiation toward the first surface from different locations. Then, the detecting step could comprise determining one or more points in time where the scanning beams emit radiation toward the detector(s), and wherein the determining step comprises determining the position also on the basis of the point(s) in time. This is described in more detail further above.

Also, the radiation provider may emit radiation into the radiation transmissive element and onto the first surface, where the radiation transmissive element guides radiation from the radiation provider to the first surface.

Also, the radiation provider may emit radiation into the backlight in a manner that scans the waveguide in x,y plane. Two scanning radiation emitters is sufficient to create ambiguous multiple input detection. Provided at least three detectors receive signals through the waveguide it is possible to discern between ambiguous touch detections. Provided at least three scanning emitters with sufficient spacing is possible to receive signal through the waveguide and discern unambiguous multiple points of touch.

In one embodiment, the radiation providing step comprises each of a plurality of radiation emitters emitting radiation through the second surface and onto the first surface, each radiation emitter or group of radiation emitters being controlled independently of other emitters or groups of emitters. In that situation, the radiation providing step could comprise the radiation emitters or groups of radiation emitters emitting, sequentially in a predetermined order, radiation with a predetermined variation in wavelength or intensity, and wherein the determination step comprises determining the position on the basis of a wavelength/intensity variation and a point in time of detection of the variation.

As an alternative, in a particularly interesting embodiment, as is described above, the radiation providing step comprises providing each radiation emitter with a means for altering radiation, all altering means receiving radiation from one or more radiation emitters providing radiation to a plurality of the altering means. Then, each radiation emitter could provide radiation to a plurality of altering means, no altering means receiving radiation from more than one radiation emitter, and wherein the properties of the radiation emitters is controlled independently of radiation altering properties of the individual altering means.

Also, in that embodiment, the radiation providing step could comprise the emitters providing, through the second surface and onto the first surface of the radiation transmissive element, radiation representing a predetermined image, and wherein the radiation providing step further comprises altering the emission of one or more radiation emitters by addition or subtraction of a predetermined intensity or wavelength, the determining step comprising determining the position as a position in which the intensity or wavelength has been altered.

As mentioned above, in this situation, properties/characteristics less easily discernible to the human eye may be preferred.

In addition, the radiation providing step may in one situation comprise sequentially altering the emission of different groups of emitters. Alternatively, more emitters may emit simultaneously but with different characteristics/properties.

In a particularly interesting embodiment, the method comprises:

determining a first position of a first scattering/reflecting element and a second position of a second scattering/ reflecting element and to providing first radiation at or on the first position and second radiation at or on the second position, the first radiation having a first property/characteristic or a property/characteristic selected from a first group of properties/characteristics, and the second radiation having a second property/characteristic or a property/characteristic selected from a second group of properties/characteristics, the first and second properties/characteristics being different and the first and second groups of properties/characteristics having no property/characteristic in common, and tracking the first position on the basis of signal(s) relating to detected radiation having the first property/characteristic or radiation having a property/characteristic from the first group and tracking the second position on the basis of signal(s) relating to detected radiation having the second property/ characteristic or radiation having a property/characteristic from the second group.

As mentioned above, a fast detection may be preferred in order to have a high detection rate and/or in order to provide a detection not easily discernible to the human eye. Thus, preferably, the radiation providing step comprises providing radiation with a property/characteristic which is a variation in the amplitude/wavelength of the radiation, the variation being at least 50 Hz, such as at least 200 Hz, preferably at least 500 Hz, such as at least 750 Hz, preferably at least 1 KHz, such as at least 5 KHz, preferably at least 10 KHz, such as at least 25 KHz, preferably at least 50 KHz.

In a third aspect, the invention relates to a system for determining a position of a scattering/reflecting element, the system comprising:

a radiation transmissive element having a first surface adapted to be engaged by the scattering/reflecting element and a second surface opposite to the first surface, a monitor or display comprising a plurality of controllable radiation emitters each being adapted to provide radiation through the radiation transmissive element from the second surface toward a predetermined area of the first surface, the monitor or display being adapted to control the emitters to provide radiation representing predetermined images on the first surface, one or more detectors for detecting radiation emitted by the monitor or display, scattered/reflected (by the scattering/reflecting element) at the position of the first surface, into the radiation transmissive element and guided by the radiation transmissive element toward the detector(s) and for outputting one or more corresponding signals, means for determining the position on the basis of the signal(s) from the detector(s), wherein:
the monitor or display is adapted to control predetermined radiation emitters or groups of radiation emitters to alter the wavelength/intensity of radiation emitted thereby in order for the wavelength/intensity of the emitters to deviate from that of an actual predetermined image, and the determining means is adapted to determine the position as a position in which the intensity/wavelength is altered in relation to that of the predetermined image.

Naturally, a number of the features of the first two aspects are equally applicable for the present aspect.

According to this aspect, the radiation emitters provide, through the radiation transmissive element and on the first surface, radiation representing one or more images as a normal display or monitor would. In the present context, the radiation transmissive element then provides this display/monitor with a touch pad facility in which the radiation from the radiation emitters may be reflected/scattered by a reflecting/scattering element engaging the first surface back into the first surface and into the radiation transmissive element which will guide reflected/scattered toward the detector(s).

In order to be able to determine the position of the touch when the detector preferably is not angle sensitive or sensitive to the position of touch, the radiation may be altered, whereby determination of the position may be made on the basis of the alteration of the radiation and optionally also the point in time of the alteration.

As mentioned above, in this situation, less visible or discernible alterations of the radiation may be preferred.

In one embodiment, the monitor or display is adapted to, sequentially, for each of a number of groups of radiation emitters, alter between providing the wavelength/intensity of the predetermined image and the altered intensity/wavelength, and wherein the determining means is adapted to determine the position on the basis of:
a point in time in which the altered intensity/wavelength is detected,
a group of radiation emitters having altered the wavelength/intensity at that point in time, and
an area of the first surface in which a radiation emitter of the group of radiation emitters is adapted to provide radiation.

As mentioned above, the sequential alteration facilitates the use of fewer properties/characteristics, as only a reduced area need to be "resolved", compared to a larger area requiring a larger number of characteristics/properties in order to obtain the same absolute resolution.

In this situation, the determining means may be adapted to determine the position on the basis of an initial determination of an area and a subsequent repetition of the process of:
1. performing a determination of:
   a. altering the radiation of the determined radiation emitters within the predetermined area,
   b. determining whether an altered intensity/wavelength is detected,
   c. if so, determining a reduced, predetermined area as a part of the predetermined area and repeating step 1. within the reduced, predetermined area,
   d. if not, repeating step 1. with an amended predetermined area being the last predetermined area within which an altered intensity/wavelength was detected subtracted the predetermined area of step a.

The process 1 may be repeated a predetermined number of times or until the resulting area is sufficiently small.

Also, in this embodiment, the monitor or display may be adapted to control all groups of radiation emitters to alter the wavelength/intensity sequentially and in a predetermined order. This order may be one in which all areas of the first surface are scanned or analyzed in a given direction or wherein predetermined areas or emitters alter the radiation in an order not linear on the first surface.

In this situation, the monitor or display may be adapted to control the radiation emitters to alter the wavelength/intensity of the radiation emitted thereby in an order so that the radiation, at the first surface, is altered sequentially along a predetermined direction in a plane of the first surface. In this manner, a searching or an analysis may be performed as a bar or a group of bars translated over the surface in a predetermined manner.

Naturally, all emitters within a group may alter the radiation in the same manner. In this manner, it may be determined that a touch position is where the group emits the radiation onto the first surface, but no more information may then be derived. Alternatively, the monitor or display may be adapted to control the radiation emitters of the groups controlled to alter the radiation emitted thereby so that each of the radiation emitters of the group alters the intensity/wavelength in a different manner. In that situation, it may additionally be determined where within that area the touch is positioned.

A particular manner of scanning, searching, and/or analyzing touches is one wherein the monitor or display is adapted to alter the radiation of each radiation emitter in a predetermined manner and over a predetermined period of time. In this manner, e.g. a bar code-like pattern may be scanned over the surface in order to identify a position or parameters of a touch. Using a bar code having a number of parallel stripes (of the same or different widths and having the same or different characteristics/properties), a lot of information may be derived relating to the touch position.

In another situation, the monitor or display is adapted to control radiation emitters, adapted to provide radiation to a predetermined area at or around a predetermined position, to alter the wavelength/intensity of radiation emitted thereby in a particular or predetermined manner. In this manner, a touch position may be tracked in order to determine movement of the position or changes in parameters of the touch, such as an extent or shape thereof—or a colour thereof. This information may be used for a number of purposes in addition to that relating to the actual position of the touch.

In this situation, the monitor or display may be adapted to control different ones of the radiation emitters to alter the wavelength/intensity differently, and wherein the determining means is adapted to determine the position on the basis of the actual altering of the intensity/wavelength detected. Thus, instead of providing all emitters or all radiation in an area with the same properties/characteristics, different sub-areas may be provided with radiation of different characteristics/properties by different emitters in order to be able to determine changes also inside these areas.

A last aspect of the invention relates to a method for determining a position of a scattering/reflecting element, the method comprising:

providing radiation through a radiation transmissive element, having a first surface adapted to be engaged by the scattering/reflecting element and a second surface opposite to the first surface, from the second surface toward a predetermined area of the first surface, the radiation being provided by a monitor or display comprising a plurality of controllable radiation emitters each providing radiation to a predetermined area of the first surface, the monitor or display controlling the emitters to provide radiation representing one or more predetermined images on the first surface, detecting radiation emitted by the monitor or display, scattered/reflected by the scattering/reflecting element at the position of the first surface, into the radiation transmissive element and guided by the radiation transmissive element toward one or more detector(s), and providing one or more corresponding signals, and determining the position on the basis of the signal(s) from the detector(s), wherein:

the monitor or display controls predetermined radiation emitters or groups of radiation emitters to alter the wavelength/intensity of radiation emitted thereby so that the wavelength/intensity of the emitters deviate from that of an actual predetermined image(s), and the position is determined as a position in which the intensity/wavelength is altered in relation to that of the predetermined image.

In this situation, the radiation emitters of each of a number of groups of radiation emitters, may sequentially alter between providing the wavelength/intensity of the predetermined image and the altered intensity/wavelength, and wherein the position is determined on the basis of:

a point in time in which the altered intensity/wavelength is detected, a group of radiation emitters having altered the wavelength/intensity at that point in time, and an area of the first surface in which a radiation emitter of the group of radiation emitters is adapted to provide radiation.

Then, the position may be determined on the basis of an initially determined area and a subsequent repetition of the process of:

1. performing a determination of:
   a. altering the radiation of the determined radiation emitters within the predetermined area,
   b. determining whether an altered intensity/wavelength is detected,
   c. If so, determining a reduced, predetermined area as a part of the predetermined area and repeating step 1. within the reduced, predetermined area,
   d. if not, repeating step 1. with an amended predetermined area being the last predetermined area within which an altered intensity/wavelength was detected subtracted the predetermined area of step a.

As mentioned above, the process 1 may be iterated a predetermined number of times, or the process may proceed until the area is sufficiently small.

In one embodiment, all groups of radiation emitters alter the wavelength/intensity sequentially and in a predetermined order. Thus, a structured searching may be performed.

In this situation, the radiation emitters may alter the wavelength/intensity of the radiation emitted thereby in an order so that the radiation, at the first surface, is altered sequentially along a predetermined direction in a plane of the first surface. In this manner, a scanning using a linear search over the surface may be performed.

In addition, the monitor or display may be adapted to control the radiation emitters of the groups controlled to alter the radiation emitted thereby so that each of the radiation emitters of the group alters the intensity/wavelength in a different manner. Thus, even the position along the line may be determined instead of merely the position of the line at the time of detection of a touch.

Also or alternatively, the radiation of each radiation emitter in each group may be altered in a predetermined manner and over a predetermined period of time. Thus, additional information may be provided relating to the position of a touch or other information relating to the touch.

In another embodiment, radiation emitters providing radiation to a predetermined area at or around a predetermined position emit radiation with a wavelength/intensity altered in a predetermined manner. Thus, a touch may be tracked independently of a search or tracking of other positions.

In that situation, different ones of the radiation emitters may emit radiation with differently altered wavelength/intensity, and the position may be determined on the basis of the actual altering of the intensity/wavelength detected.

A fifth aspect of the invention relates to a system for determining a position of a scattering/reflecting element, the system comprising:

a radiation transmissive element having a first surface adapted to be engaged by the scattering/reflecting element and a second surface opposite to the first surface, a radiation provider adapted to provide radiation to or at the first surface in order for the scattering/reflecting element to be able to scatter/reflect radiation into the radiation transmissive element at the position on the first surface, one or more detectors for detecting radiation scattered/reflected, at the position at the first surface, into the radiation transmissive element and guided by the radiation transmissive element toward the detector(s) and for outputting one or more corresponding signals, means for determining the position on the basis of the signal(s) from the detector(s), wherein:

the radiation provider is adapted to provide at least two sweeping beams or radiation from two different positions, the sweeping beams impinging on the detector(s), and the determining means is adapted to determine the position on the basis of points of time of impinging of the sweeping beams on the detector(s) and of the detector(s) receiving scattered/reflected radiation.

Thus, at least two beams are scanned over or below the first surface from different positions over the first surface or outside the first surface, in a projection on to a plane of the first surface.

These beams are scanned over an angular path, normally within a plane of the first surface or inside the transmissive element, whereby the radiation may be conducted by TIR and therefore may travel out of the plane of the first surface while staying within the transmissive element. In this angular path or angle interval, the detector(s) is/are positioned so that the system may determine when the beam impinges on the detector. Knowing the relative positions of the positions from which the beams are launched and the detector(s), all angular directions of the beams may be extrapolated from points in time at which the beams are detected by the detector(s). Thus, a point in time at which a reflection/scattering is detected may be determined, and the position may be determined in that both scanning beams will have a part reflected/scattered.

In one embodiment, the radiation provider is adapted to launch the sweeping beams into the radiation transmissive element, each beam being constituted by one or more collimated beams launched in at least substantially the same direction in the plane of the first surface, the one or more collimated beams of each beam covering, at the point of entrance into the transmissive element, at least 10% of a thickness of the transmissive element at that position. As is described, a narrow beam in a wide transmissive element will have the beam only intercept the first surface in the pattern of a number of concentric patterns. The larger an area or the larger a part of the thickness which is covered by the radiation, the larger a part of the surface is impinged by the radiation, so that a touch may be detected.

Naturally, it is desired that as large a part of the thickness is covered by the beam(s) (either a broad beam or a number of more narrow beams), so that, preferably, at least 20%, such as at least 40%, such as at least 50%, preferably at least 75% of the thickness of the transmissive element is covered by the beam(s).

A final aspect of the invention relates to a method for determining a position of a scattering/reflecting element, the method comprising:
providing, from a radiation provider, radiation to or at a first surface of a radiation transmissive element having a first surface adapted to be engaged by the scattering/reflecting element and a second surface opposite to the first surface,
the scattering/reflecting element scattering/reflecting radiation, at the position, from the radiation provider into the radiation transmissive element at the position on the first surface,
detecting radiation scattered/reflected by the scattering/reflecting element and guided by the radiation transmissive element toward the detector(s) and providing one or more corresponding signals,
determining the position on the basis of the signal(s), wherein:
the radiation providing step comprises providing sweeping beams of radiation from at least two positions, the sweeping beams impinging on the detector(s) and
the determination step comprises performing the determination on the basis of points in time of impinging of the beams on the detector(s) and points in time of detecting scattered/reflected radiation.

Then, as described above, preferably the radiation providing step comprises launching the sweeping beams into the radiation transmissive element, each beam being constituted by one or more collimated beams launched in at least substantially the same direction in the plane of the first surface, the one or more collimated beams of each beam covering, at the point of entrance into the transmissive element, at least 10% of a thickness of the transmissive element at that position.

BRIEF DESCRIPTION OF THE DRAWINGS

In the following, preferred embodiments of the invention are described with reference to the drawing, wherein.

DETAILED DESCRIPTION

Figure 1:
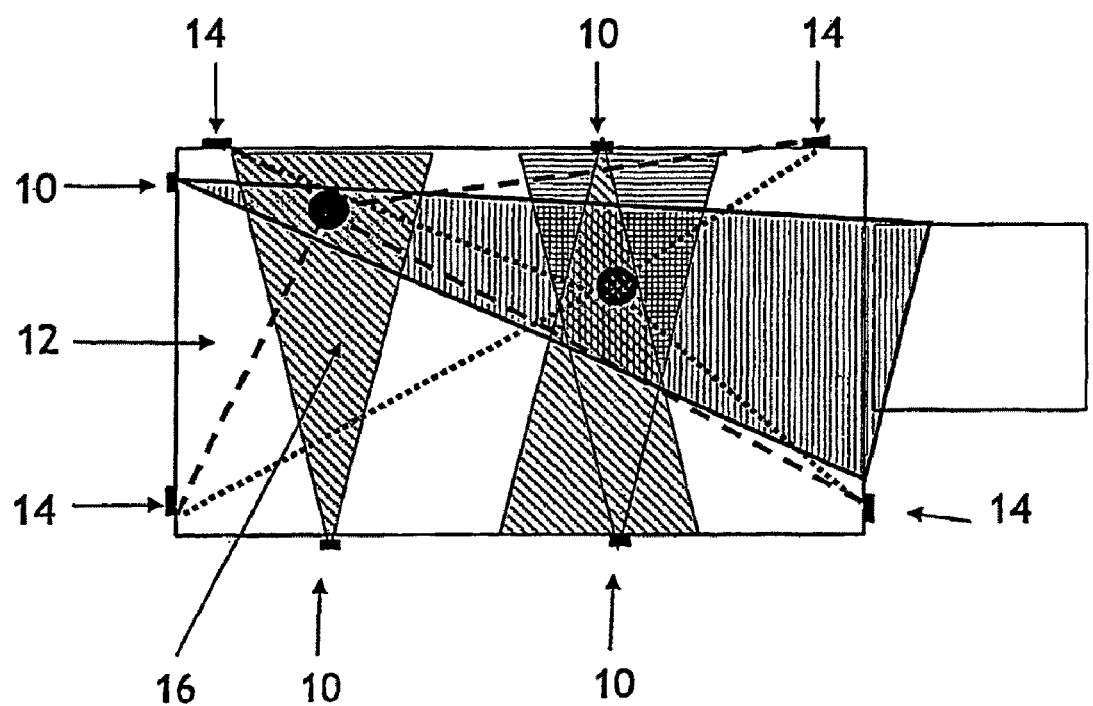
FIG. 1 illustrates a first embodiment in which the radiation is emitted into a radiation transmissive element from edges thereof.
Figure 2:
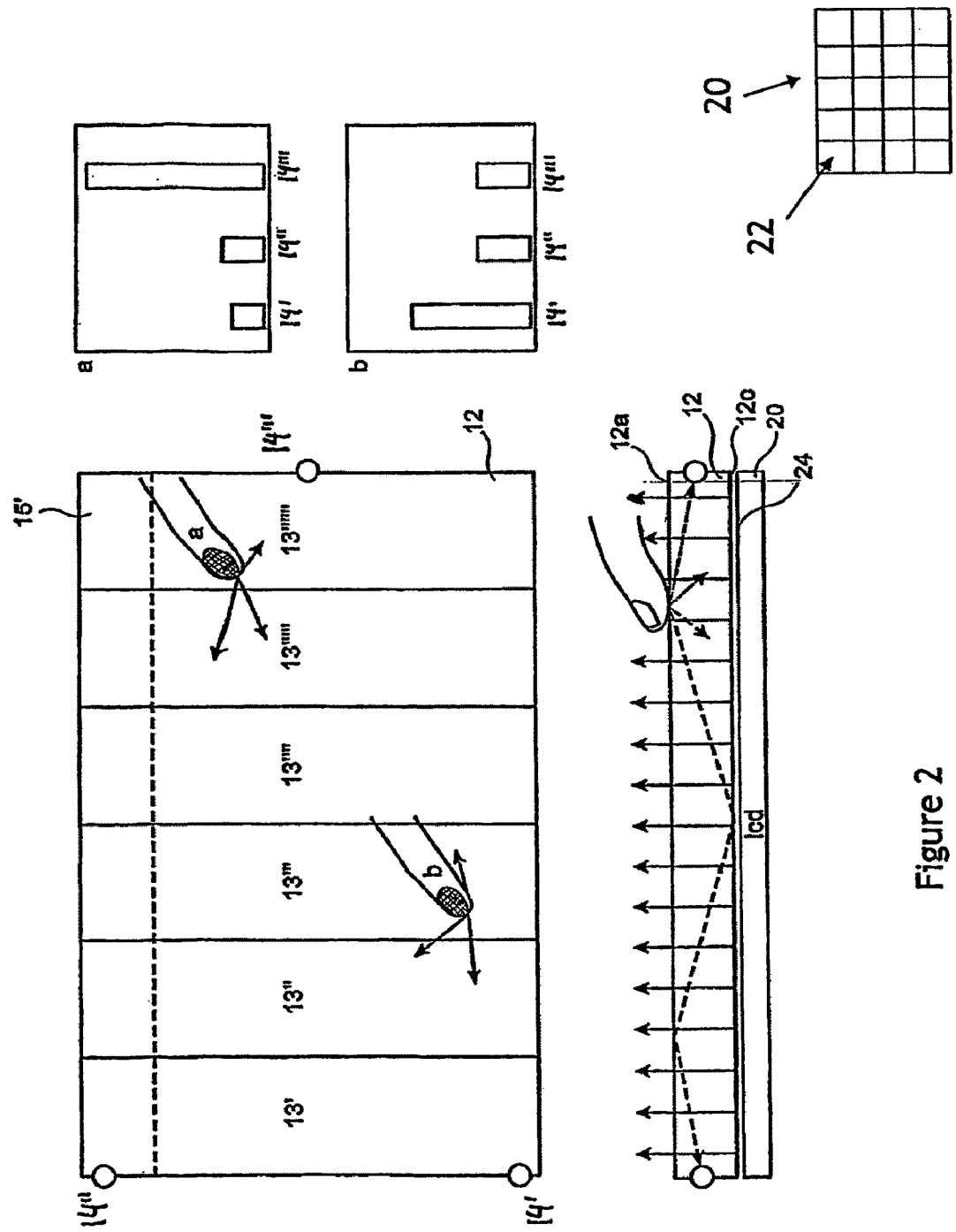
FIG. 2 illustrates another embodiment in which the radiation is emitted into a radiation transmissive element from below.

The overall invention is illustrated in FIGS. 1 and 2, in which a radiation transmissive element 12 is used having a first surface 12a adapted to be engaged by a scattering/reflecting element a, here illustrated as a finger.

Radiation is transmitted into the radiation transmissive element by radiation providers 10 (in FIG. 1) or 20 (in FIG. 2). This radiation impinges on the first surface 12a, where it is scattered by the scattering/reflecting element a, where after it is guided by the element 12 toward detectors 14 detecting radiation.

The radiation transmissive element 12 also has a second surface 12b, and the element 12 is adapted to guide radiation between the surfaces 12a and 12b by total internal reflection, if this radiation has an angle sufficiently in the plane of the element 12 for it to be totally internally reflected within the element 12. This is illustrated by the hatched zig-zag line in the element 12 in FIG. 2. The scattering performed by the reflecting/scattering element, a, is performed in a plurality of directions (normally a substantially Lambertian distribution), so any number of detectors 14 may be used.

The radiation emitted by the radiation emitters 10/20 have different properties in different areas of the first surface 12a. These properties will also be represented in the scattered radiation transported toward the detectors 14, whereby the position of the touch may be determined at the detectors 14 at any position—merely from the radiation. The individual properties, such as a modulation, preferably are simply separated in either the radiation received or in the signal output from the detectors 14.

Multiple detectors may be desired in order to either ensure that a sufficient radiation intensity is detected or in order to rule out ambiguous position determinations, such as if two areas of the first surface 12a receive radiation with the same properties.

Naturally, any number or size of the area receiving radiation with a particular property or a mix of properties may be used, whereby any precision in the position determination may be obtained.

More particularly, in FIG. 1, the radiation from the radiation providers 10 is provided inside the element 12 and is guided therein, such as by total internal reflection, from either edges of the element 12 or is introduced through the surface(s) 12a or 12b at any suitable position.

This radiation will impinge on the surface 12a and will actually extend slightly outside the surface 12a, where it may interact with a reflecting/scattering element a, where after it will be scattered/reflected back into the element 12.

The different areas of the surface 12a are determined by the positions of the radiation emitters 10 as well as their radiation characteristics. Naturally, areas may receive radiation from multiple radiation emitters 10 whereby an overlap of properties will be seen.

Alternatively, naturally, the radiation emitters 10 may be scanning or otherwise controllable emitters, which are able to vary and control the output direction of the radiation. In that manner, the direction of the radiation will determine the areas irradiated.

Different properties of the radiation may be different colours/wavelengths, different amplitude modulations (such as different amplitudes or different modulation frequencies), different points in time or time intervals of operation (radiation emission), different phase modulations (different modulation frequencies or different phases), or known digital modulation techniques, such as pulse modulation at different frequencies.

Another property or modulation technique possible is a z-angle modulation. When the radiation travelling from the radiation emitter 10 toward the point of touch has a specific angle (or is within a relatively narrow angle interval) with respect to the plane of the surface 12a, and when the radiation is guided by internal reflection, preferably total internal reflection, in the element 12, the radiation will impinge on the surface 12a with fixed intervals in a direction toward or away from the emitter. Ideally, the radiation will impinge on the surface 12a in a pattern of concentric rings around the radiation emitter. In this manner, different angles will provide different patterns of concentric rings around the individual radiation provider/emitter and with a pitch defined by the z-angle.

Naturally, the properties from a radiation emitter and/or in an area may change over time. There is no requirement that the same property be provided by a radiation emitter throughout a session or a life time of the pad.

Actually, these modulations or properties may be mixed in any manner desired. The actual property or mix of properties of detected radiation may be determined from the radiation received (such as using a colour sensitive or angle sensitive detector) or from the signal from the detector (such as the determination of a frequency or phase of an amplitude modulation. Also, a mix of modulations may be determined in that e.g. a mix of two amplitude modulations will provide a mixed signal with both frequencies/phases. Deriving the individual frequencies or phases from that mixed signal is trivial.

In general, different properties, modulations or characteristics of the radiation may be used. Such properties, modulations or characteristics may be a particular colour/wavelength, or a predetermined alteration thereof, as well as an amplitude modulation (such as a change in amplitude or intensity or a modulation frequency), a particular point in time or a time interval of operation (radiation emission), phase modulation (modulation frequency or phase), or any known digital modulation technique, such as pulse modulation at one or more predetermined frequencies.

In the embodiment of FIG. 1, the precision of the position determination will relate to the number of radiation emitters 10 and their positions as well as the number of available properties, in that these parameters determine the number of individual areas inside which different properties may be generated. The number of areas also determine the size of areas inside which the same property or mix of properties is detected.

In the embodiment in FIG. 2, the radiation is provided by a display or monitor 20, which comprises a plurality of individual radiation emitters 22 which together form the image forming display/monitor and which are adapted to emit radiation through the element 12 from the surface 12b to the surface 12a.

Thus, the radiation transmissive element 12 forms a layer, such as a protective layer, in front of the display/monitor 20.

The radiation emitted by the display/monitor 20 and launched onto the surface 12a at the position of touch, is scattered/reflected by the scattering/reflecting element a back into the element 12, and part of this back-scattered/reflected radiation will be guided by the element 12 toward the detector(s) 14.

Naturally, the display/monitor 20 may be any type of display/monitor, such as a back-lit or front-lit LCD-display, an active or passive matrix OLED, a Field Emission Display (FED), a Surface conductor Electron emission Display (SED), a Ferro electric Liquid Crystal Display (FLCD), a plasma display, a projected display (DLP or micro display monitors), displays using the electrowetting technique or the mems iridescence technique or a TFT display, such as a poly-silicon or an amorphous silicon display. The individual radiation emitters may themselves be controllable as to wavelength or intensity, such as OLEDs, or the emitters may comprise an element adapted to control the radiation of the emitter, such as is the case in a back-lit LCD.

Normally, the individual emitters 22 are directed parallelly through the element 12, and each is adapted to provide radiation to a separate area of the surface 12a, even though these areas may overlap.

Radiation with different properties may be provided to different areas by e.g. providing radiation with different wavelengths in each of the areas 13', 13'', 13''', 13'''', 13''''', and 13''''''. Also, the area 15' may be provided with radiation having an intensity or amplitude modulated by a predetermined frequency. In this manner, the colour/wavelength and the modulation frequency will unambiguously determine from which area the detected radiation was scattered/reflected, that is, in which area the point of touch is positioned.

Again, different areas may, in fact, receive radiation with the same properties, whereby the intensity received by individual detectors 14', 14'', and 14''', may be taken into account in order to determine the correct position of the touch on the basis also on the intensity received. The received intensities at the three detectors is illustrated in the right side of FIG. 2.

As mentioned above, a large number of properties may be provided by the display/monitor 20. Also, due to the areas defined on the surface 12a, in FIG. 2, being defined by the positions of the group of radiation emitters 22 defining the area, a larger number of area shapes and sizes may be selected compared to the embodiment in FIG. 1.

An advantage of the embodiment of FIG. 2 is that the display/monitor 20 may, in addition to providing the radiation with the properties defining the areas and used for the determination of the touch position, also be used for providing information to a user as a normal display/monitor 20.

In this situation, the properties provided to the radiation preferably should not distort the information provided to the user, normally in the form of one or more predetermined images, to a too large extent.

To that effect, these properties may be a slight alteration of the intensity or wavelength/colour of the radiation provided by one or more radiation emitters 22 in relation to the emission of the individual emitter in relation to the providing of the predetermined image. This alteration may be a single, temporary increase/reduction of the intensity or change in the wavelength/colour, or it may be a series of increases/reductions/changes performed over time. Thus, the property may be the actual sequence of these reductions/increases/changes, the time duration thereof, or the level or amount of reduction/increase/change.

Naturally, these changes may be made so subtle or so fast that the human eye may not be able to detect them.

It should be noted that the embodiment of FIG. 1 may also be used in front of a display/monitor 20, and in this embodiment, the radiation for use in the touch determination and that from the display/monitor 20 may be separated. In that situation, the radiation transmitted into the radiation transmissive means is visible. In the embodiments in which the radiation is transmitted into the radiation transmissive means from a side thereof (where it is not required that the user sees the radiation), the radiation is preferably not visible, such as NIR, UV, or IR radiation.

Figure 3:
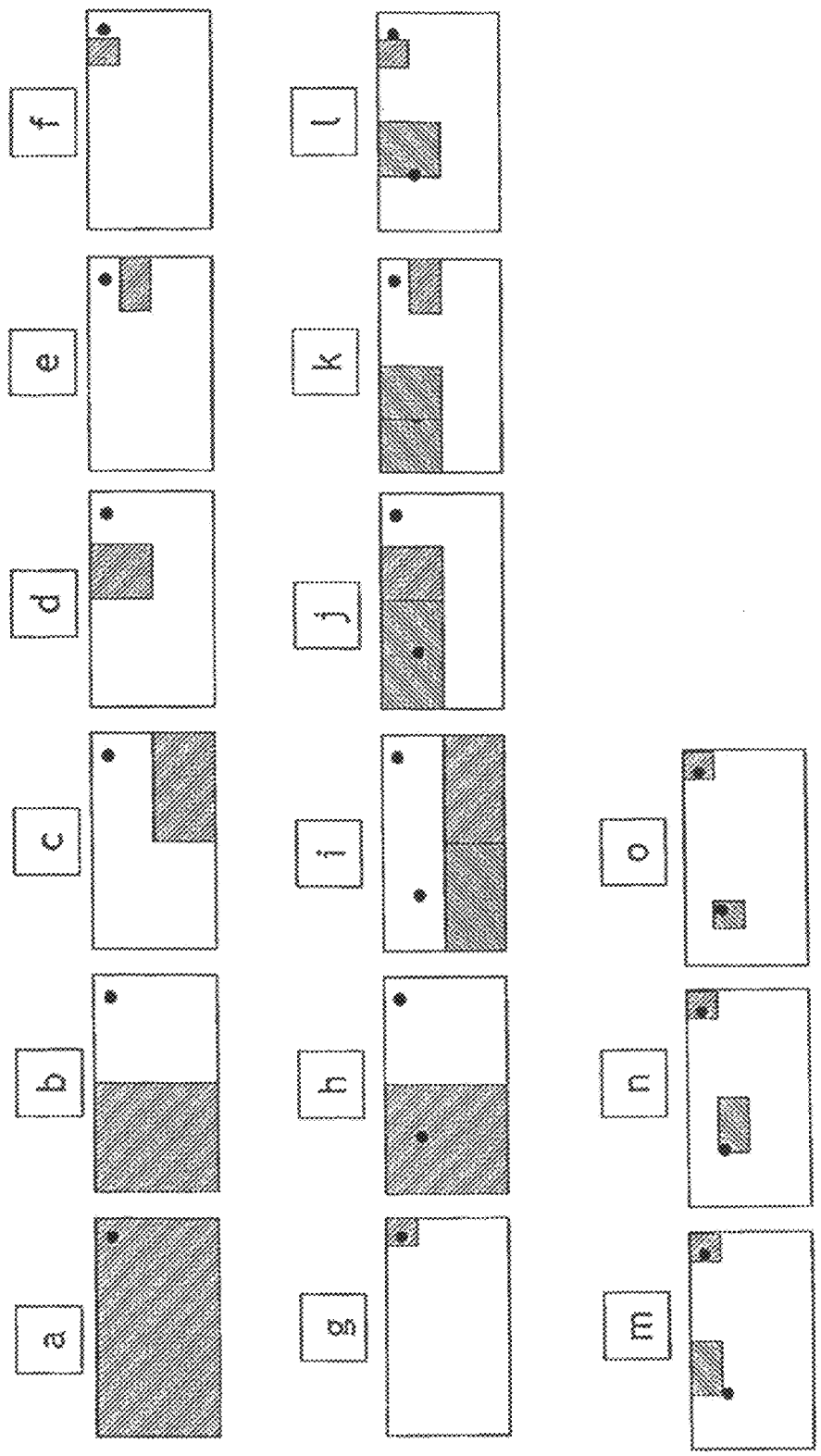
FIG. 3 illustrates a first method of searching for a touch position.
Figure 4:
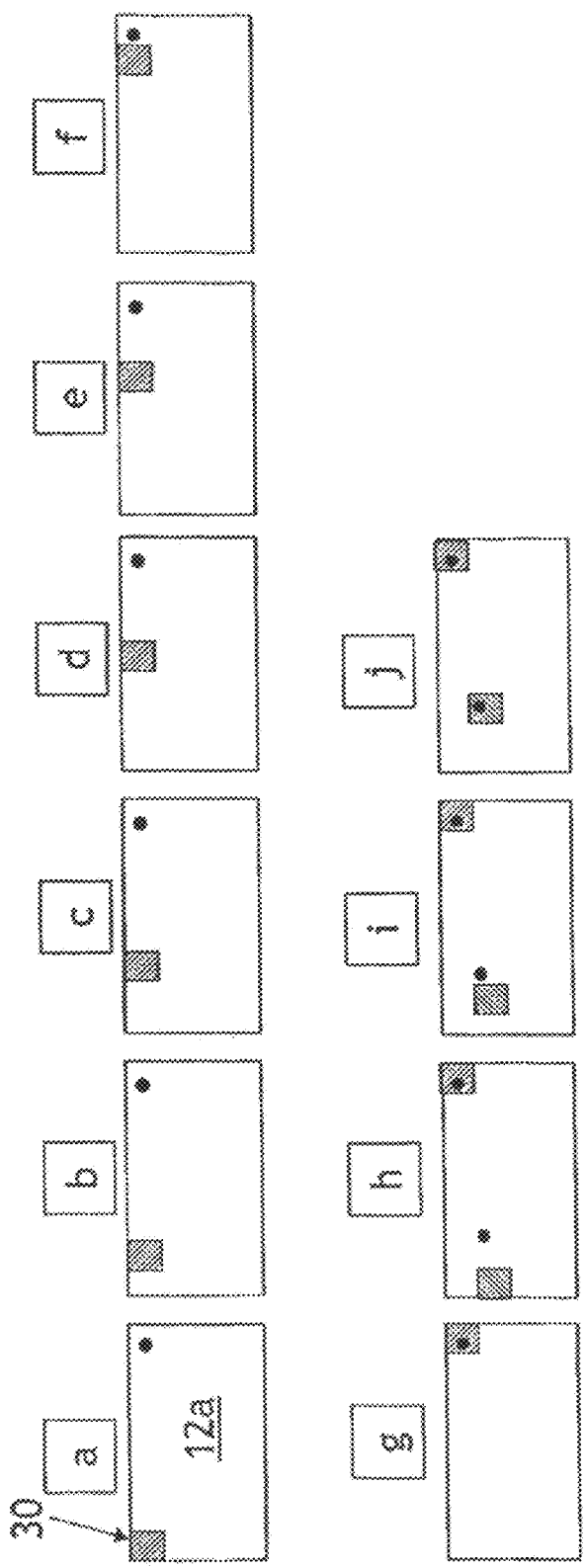
FIG. 4 illustrates a second method of searching for a touch position.
Figure 5:
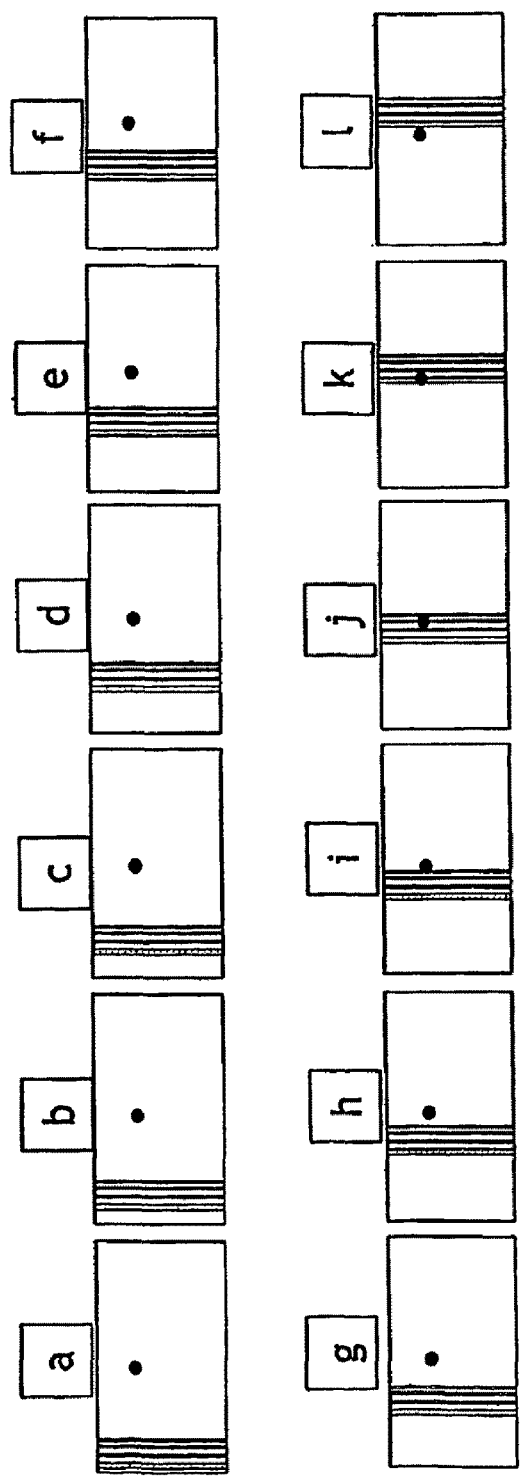
FIG. 5 illustrates a third method of searching for a touch position.
Figure 6:
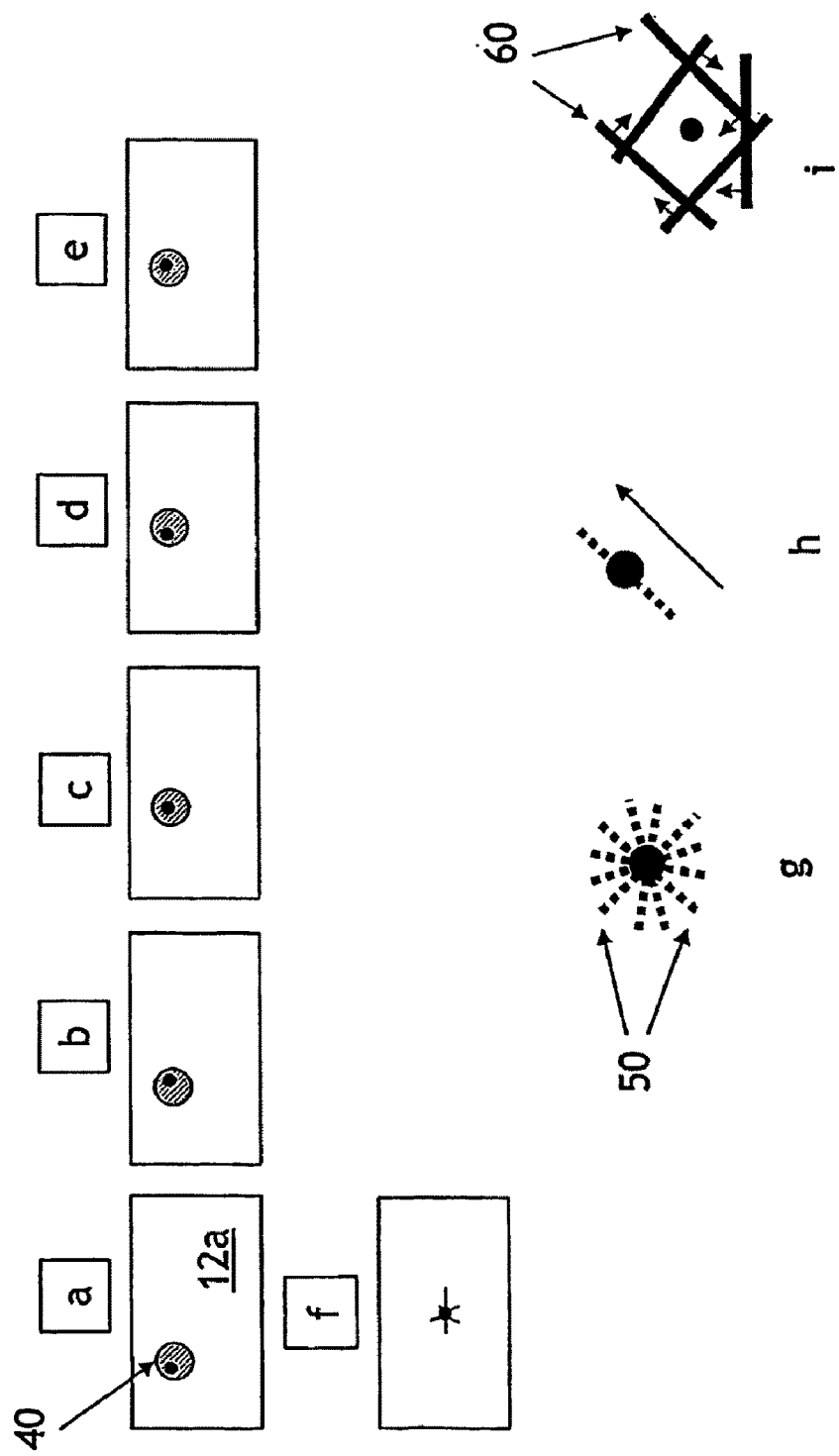
FIG. 6 illustrates different methods of tracking a touch position.

Different manners of determining the position of a touch may be chosen. Three different manners are illustrated in FIGS. 3-5, but many other manners exist. In addition, different manners of tracking a determined touch are illustrated in FIG. 6. Again, many other manners exist of tracking the movement of a touching object on a surface 12a.

In FIG. 3, a so-called binary search is illustrated. In this manner, firstly the full surface 12a is irradiated by radiation having a predetermined property. If a touch is detected, that is, if radiation is detected and it exhibits the property, the touch will be within the initial area. Then, that area is subdivided, and a new determination is performed. If a touch is not detected in the subdivided area, the touch is in the remaining part of the former area, and the search is performed in that remaining area. However, if a touch was detected, this area will again be subdivided, and the search thus commences. This method may be repeated until a predetermined number of iterations has been performed or until the remaining area is sufficiently small.

In part a in FIG. 3, the whole surface is irradiated in order to determine whether a touch is present at all. In part b, the hatched area is searched, and no touch is found. Therefore, the touch must be in the other half. In part c, half of the right half is searched, and as no touch is seen, it must be in the upper, right quarter. In D, it was not found in the left part, so the search is carried on in the lower half of the right half. Finally, in part g, the search ends with a determination of a position of the touch.

Naturally, the above method relates to the use only of a single property of the radiation. Normally, many different properties are available which may be provided by the emitters and may be determined and discerned by the detectors and/or attached electronics. Thus, instead of dividing the area to be searched into only two areas, multiple areas having none, one or more properties present therein. From this determination, an area may be determined in which a touch is present, and the same subdivision may now be performed with the same number of sub-areas. This type of search is quite fast.

In addition, multiple touches may be determined, as long as these are in areas with different properties or different mixes of properties.

The touch position first identified is noted, and the search continues for any other points of touch having occurred after the first binary search was carried out. In part h, such a touch is identified in half the area, and in part i, half of the area seen in part h is searched. I in part j, the search covers ¾ of the remaining area in that the point of touch detected in part h continues to narrow the area in which this position is, and searches for additional points of touch goes on in the area not searched in part h. Thus, two searches are now performed simultaneously, which is performed using two different modulations. In parts j-o, the position of the second point of touch is determined in the same manner as the first point of touch, and simultaneously, the remaining area is searched for additional points of touch.

Detection of multiple positions of touch may be desired or required, as multiple touches may actually take place.

Another manner of determining multiple positions of touch may be seen in FIG. 4, in which an area 30 of radiation having an altered property is scanned over the surface 12a in steps a-f. In step g, a point of touch is determined, but the scan carries on in the next line, in steps h and i, and a next touch is determined in step j. Naturally, this method may carry on in order to scan the whole surface 12a, or it may stop once a maximum number of touches has been detected.

Naturally, any shape, size and movement pattern of the area scanned may be used.

Also, in order to be able to track one touch and either search for another touch or track another touch, the radiation used for those purposes, or the areas in which these purposes are carried out, preferably has different properties in order to not confuse these determinations. Consequently, once a touch has been identified, and if other touches are to be identified, searched for or tracked, either the first touch is tracked using radiation of a different property, or the continued search/tracking/identification of the next touch is carried out with a different property.

This fast tracking may be performed by assigning a large number of properties each used for searching a limited area of the total area. Then, simultaneous searching may be performed in multiple areas independently of each other.

In this respect, it may be desirable to determine different property intervals. As will be seen below, it may be desired to actually track a single touch using a number of different properties, whereby it may be desired to assign an interval or a type of property to each touch. Thus, one touch may be tracked or analyzed using only an amplitude variation in the intensity of the radiation, or only a green-shifting of the radiation, whereby another touch may be searched for, analyzed or tracked using a phase modulation, a red-shifting, or the like. Within an amplitude modulation or a green-shifting, different degrees or frequencies may be provided, whereby different sub-properties within the property of an amplitude variation or a green-shifting may be determined.

Yet another manner of determining a touch or a position of a touch—or multiple touches, may be seen in FIG. 5 in which one or more lines or elongate areas with radiation of different properties are scanned over the surface 12a. In a simple embodiment, a single line is scanned over the surface 12a, and the radiation with the different property will be detected, when the line reaches the touch. In this manner, the position of the touch along this direction may be determined.

Subsequently, a scan along another direction may be performed in order to determine the actual position of the touch. Alternatively, the line scanned over the surface may have different properties along its length, so that also the position along the length of the line may be determined in a single scan.

In the embodiment illustrated in FIG. 5, a barcode is scanned over the surface. The bar code comprises a number of parallel lines each representing radiation of an altered property.

Naturally, each line may have the same or another property, and each line may but need not have the same property along its length. The property may be both a fixed, predetermined change in intensity/colour or the like, or the lines may be all black or white.

When scanning the bar code over the surface and the touch, a time variation will be seen in the radiation of altered radiation.

The use of such moving barcodes gives a clearly distinguishable intensity or signal variation when moving across a touch pad area and a touch position. As a result thereof, an amplitude variation is obtained corresponding to the barcode as well as the physical extent of the touching object. In addition, multiple barcodes moving in different directions enables the system to determine the position of the touch in different dimensions as well as information relating to the extent of the touching object in those dimensions.

Naturally, a more simple manner may be one in which two different properties are determined, where all emitters (or a predetermined fraction—see below) may be altered more and more by that property the farther the emitter is in one direction on the surface 12*a*. Then, the same may be performed along another direction, where emitters are increasingly altered by another property the farther the emitters are along that direction. In this manner, a coordinate system is obtained from which the degree of the two properties, as determined from the radiation, will directly provide the coordinate of the emitter, and thus the touch, in that coordinate system.

Barcode scanning is simple to achieve in e.g. fast controllable LCD backlighting, such as using LEDs or OLEDs or a radial scanning radiation source. This does not require modulation of the actual image, as the modulation is performed in the actual backlight.

Having now determined the position(s) of one or more touches, it may be desired to actually determine the shape or other characteristics of the touching object, or it may be desired to track movement of the touching object. Naturally, this may be performed in a vast number of manners, some of which are illustrated on FIG. 6.

In steps a-e of FIG. 6, an area 40, in this embodiment a circular area, encircling the position of the touch, is moved along with the direction of movement of the touch. Between steps a and b, the touch has moved to the right, and in step c, the area has been moved accordingly. In step d, the area now again has been moved to the right in anticipation of a further movement of the point of touch. However, the touch has stopped moving, and the area now is slightly displaced to the right in relation to the position of the touch. This displacement is removed by moving the area, in step e, back to the position of the touch, in order to be ready for other movements, such as in other directions, of the point of touch.

Naturally, the area may be provided with radiation with the same property, whereby it, though, will be difficult to determine the position of the touch within the area. Alternatively, different parts or positions within the area may be provided with radiation with different properties, such as is illustrated in part g of FIG. 6. Different lines 50 with different directions intersect at the center of the area and may be provided with radiation with different properties. Thus, from the radiation from this mix of properties, it will be possible to determine the position of the point of touch within the area. Also, the lines may themselves be provided with radiation of different properties, such as with a property varying along the length of the line, whereby it will be even easier to determine the position of the touch within the area.

Another embodiment is illustrated in part h of FIG. 6, in which a single line is used in which radiation is provided with different properties along the length thereof. This line is especially well adapted for detecting movement of the point of touch along the direction of the line.

The type of area or manner of providing more detailed information of the point of touch within the area may also be used for providing other information relating to the touch, such as the shape thereof. Naturally, a point of touch will have an extent in the direction of the surface 12*a*, and this extent may be determined and used for different purposes.

Different types of information derivable from a touch and different manners of e.g. controlling a process on the basis of this information may be seen in US 2003/0137494, which is hereby incorporated by reference.

Thus, the shape of the touch as well as changes therein may be determined and used in the same manner as the position information.

Another manner of determining the position or extent/shape of the touch is illustrated in part i of FIG. 6, in which lines 60 with different directions are scanned over the area of the touch. These lines may be of radiation of the same property, or different parts of a line may have different properties. Also, different lines may be scanned at different points/intervals in time or may be scanned simultaneously but have different properties.

From the information of a scan, the extent of the touch in the direction of movement of the line, as well as possibly the position of the point of touch along the direction of the line, may be determined, and as a number of directions are provided, the extent of the scan in these directions may be determined. Thus, the shape of the touch may be derived.

Naturally, also the position of the touch within the area defined by the lines may be determined, whereby movement of the touch may again be determined and acted upon.

Figure 7:
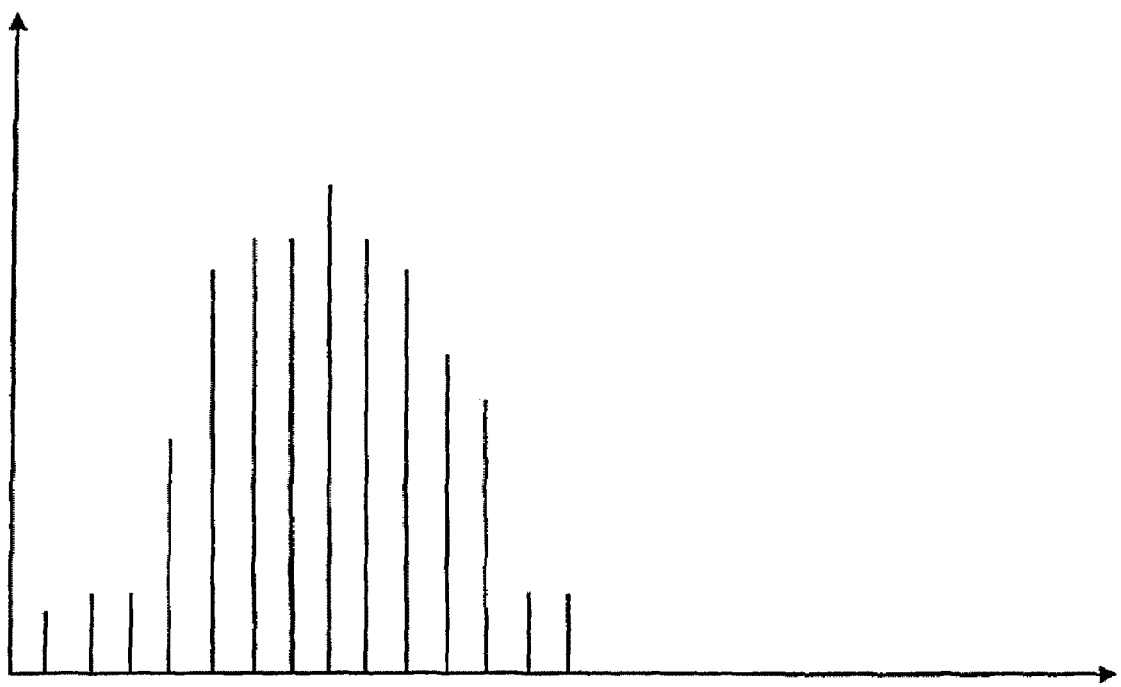
FIG. 7 illustrates a manner of increasing the position determination.

Finally, FIG. 7 illustrates information derived from a scan along a line or direction of a touching finger. It is seen that the intensity over the finger varies due to the width of the finger or touch area varying, and if this intensity variation is standard for all fingers, any precision in the determination of an actual position of the touch may be determined in that a shape or curve may be fitted to the intensity profile, and the touch position then determined from the shape or curve. Thus, a precision better than the distance between the sensing points (the lines of the graph) may be obtained.

In general, it is clear that the determination of the shape, movement or position may be provided using lines/areas or the like in which all radiation emitters 22 or 10 illuminate the touch or merely some thereof, depending on the size or expected size of the touch. Naturally, it is desired that any non-illuminated or non-irradiated parts of the surface 12*a* are smaller than the expected extent of the touching object.

If a touch is made by the tip of a stylus, it may be desired to provide radiation from many radiation emitters in order to ensure that radiation is provided also at the position of the touch. Thus, all radiation emitters 10/22 in the line/area may be used (for emitting altered radiation), whereas only every 2'nd, 10'th, 30'th or any other fraction, may be used, if the touch is by a finger having a much larger extent over the surface 12*a*.

A number of such determinations will be superposed, if a bar code is used, where each bright line in the bar code will itself provide a pattern as that illustrated. This, however is a small computational task to perform in order to provide the desired information relating to the finger or other touching object.

Figure 8:
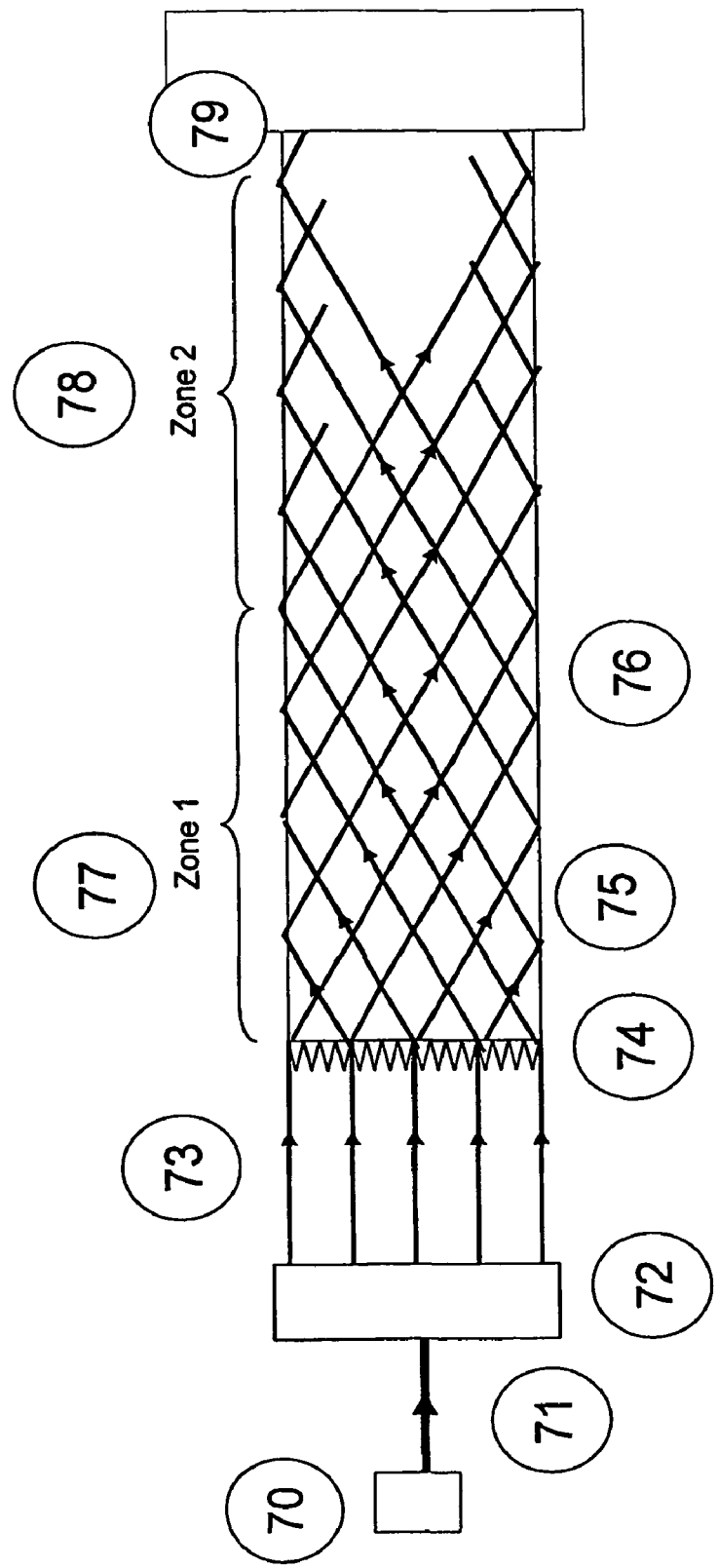
FIG. 8 illustrates a top view of a first embodiment of the invention.

FIG. 8 illustrates a side view of a scanning beam touch pad. The emitter 70 emits collimated radiation. The collimated beam 71 is sent into a beam expander 72. The expanded beam 73 is sent into a beam splitter 74 that divides the beam into two expanded collimated beams 75 with controlled zeta angles (angle between the beam and the upper, first surface) inside the waveguide 76. Zone 1, 77, zone 2, 78, illustrate where the radiation emerges to the surface of the waveguide 79 in an ordered pattern with no part of the waveguide surface left non irradiatiated.

Figure 9:
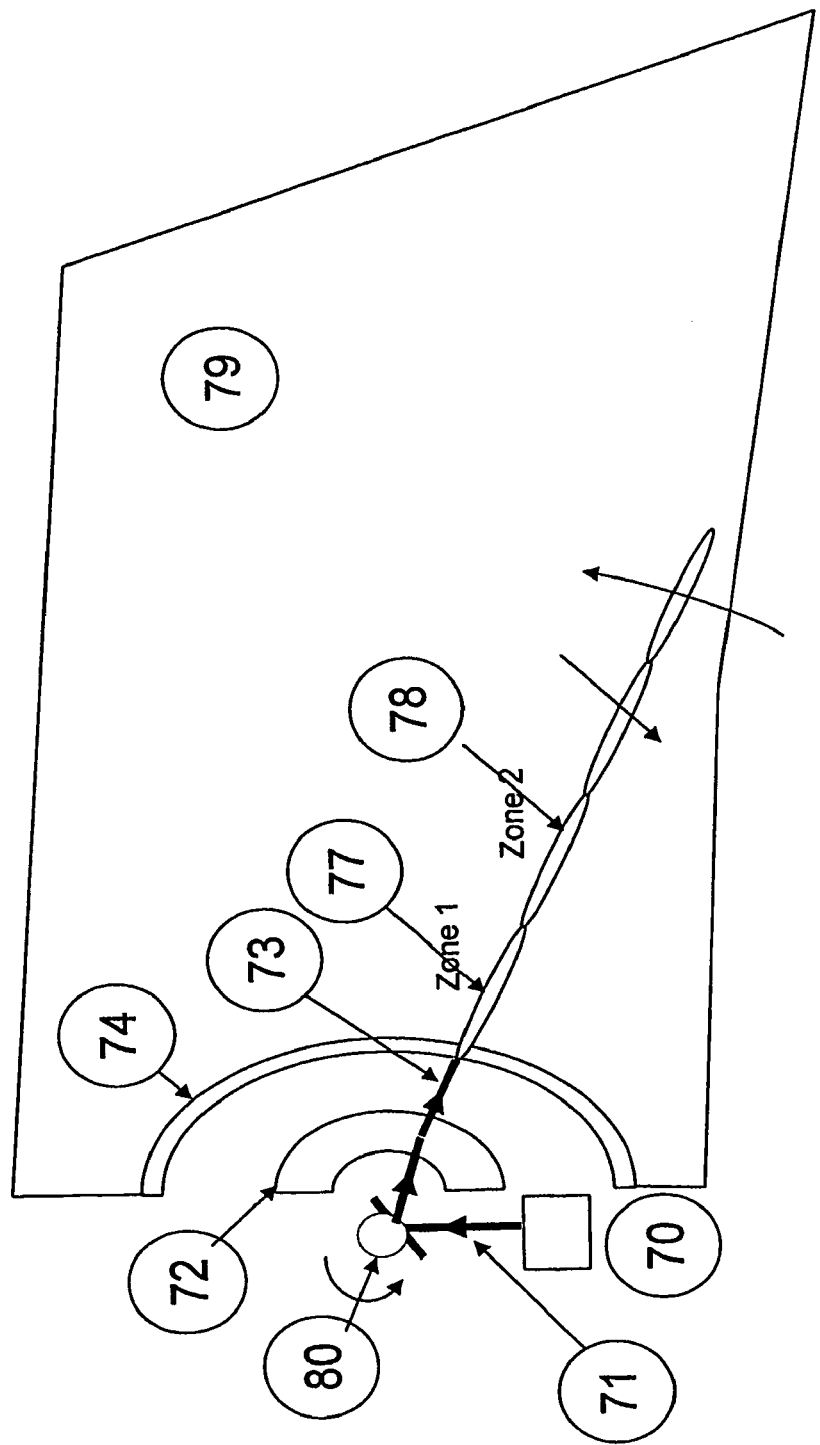
FIG. 9 illustrates another view of the embodiment of FIG. 8.

FIG. 9 illustrates a top view of the scanning beam touch screen of FIG. 8. An emitter 70 emits a collimated beam 71 towards a rotating mirror 80 that redirect the collimated beam in the x,y plane. The collimated beam 71 is directed into a beam expander 72 that expand the collimated beam and send an expanded collimated beam 73 towards a beam splitter 74 that divide that divide the beam into two expanded collimated beams 75 with controlled zeta angles inside the waveguide 76. Zone 1, 77, zone 2, 78, show where the radiation emerges to the surface of the waveguide 79 in an ordered pattern with no part of the waveguide surface left non-irradiatiated.

Figure 10:
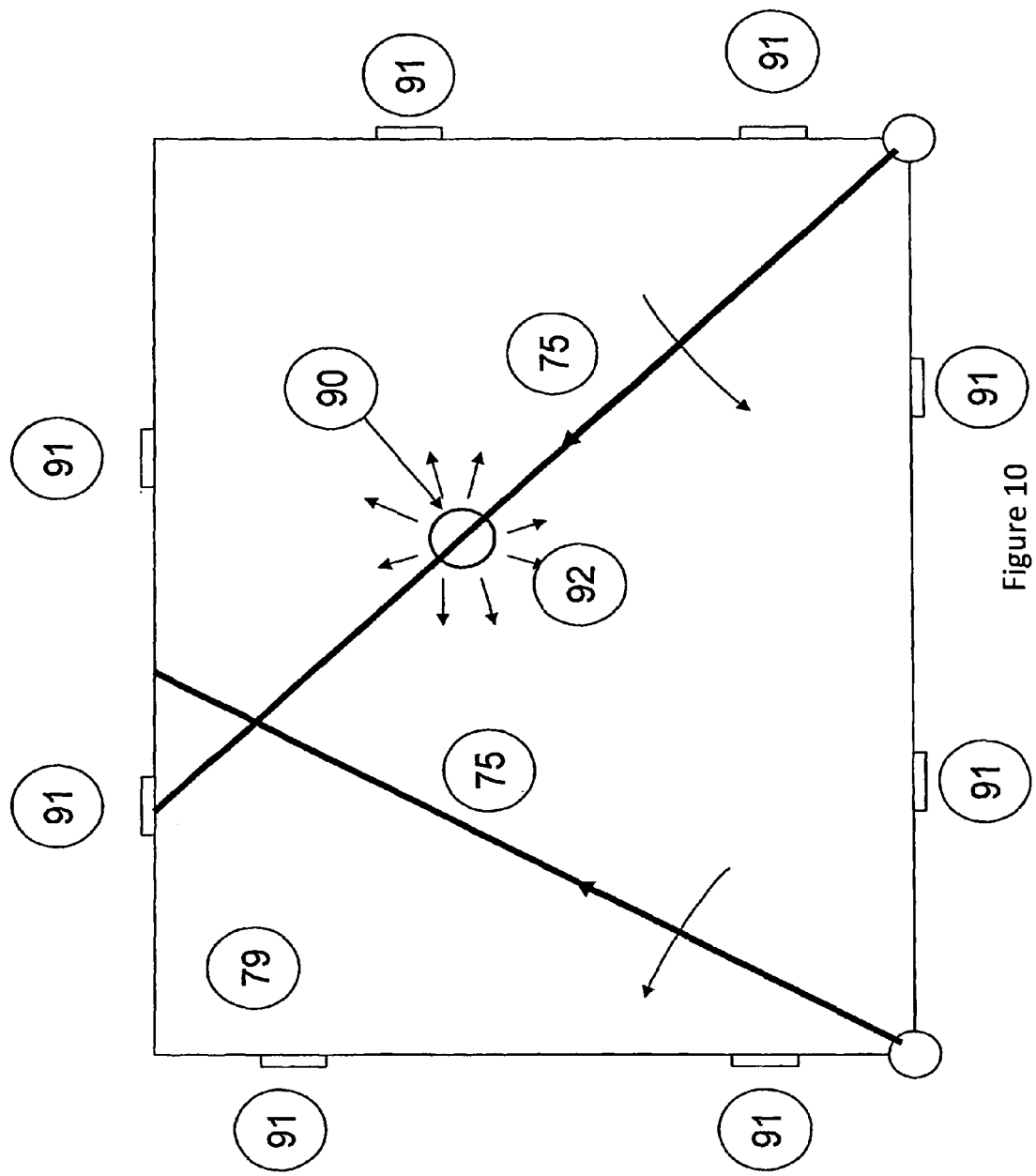
FIG. 10 illustrates a yet another view of the embodiment of FIG. 8.

FIG. 10 illustrates a top view of the scanning beam touch screen of FIGS. 8 and 9 showing the touch detection principle. The scanned beam impinges upon an object 90 touching the waveguide surface 79 The touching object 90 attenuates the radiation and scatters it. Detectors 91 coupled to the waveguide detect the scattered radiation 92. The timing of detection will reveal the angle in which the scanning beam was at the time when the touching object 90 scatters radiation. By using with two or more scanning beams 75 one at the time two or more directions to the touching object where after the position can be calculated by simple triangulation.

The invention claimed is:

1. A system for determining a position of an element to at least one of scatter and reflect radiation, the system comprising:
   a radiation transmissive element having a first surface adapted to be engaged by the element and a second surface opposite to the first surface,
   a radiation provider adapted to provide radiation to or at the first surface in order for the element to be able to at least one of scatter and reflect radiation into the radiation transmissive element at the position on the first surface,
   one or more detectors for detecting at least one of scattered and reflected radiation, at the position at the first surface, into the radiation transmissive element and guided by the radiation transmissive element toward the one or more detectors and for outputting one or more corresponding signals,
   a touch controller configured to determine the position on the basis of the one or more corresponding signals from the one or more detectors, wherein
      the touch controller is adapted to determine the position on the basis of at least one of properties and characteristics of the radiation detected by the one or more detectors, and
      the radiation provider is adapted to provide radiation with at least one of different properties and characteristics to different portions of the first surface, at least one area of the first surface receiving radiation having at least two of the at least one different properties and characteristics, the radiation provider including,
         a plurality of radiation emitters each adapted to emit radiation through the second surface and onto the first surface, each radiation emitter or group of radiation emitters being controllable independently of other emitters or groups of emitters, and each radiation emitter including a radiation altering unit receiving radiation from one or more radiation emitters providing radiation to the radiation altering unit, wherein
            the radiation altering unit includes a plurality of radiation altering elements, and each radiation emitter provides radiation to a plurality of radiation altering elements, no radiation altering elements receive radiation from more than one radiation emitter, and wherein properties of the radiation emitters are controllable independently of radiation altering properties of the individual radiation altering elements.

2. A system according to claim 1, wherein the radiation provider further comprises:
   a plurality of radiation providers each providing radiation to a predetermined portion of the first surface and each being adapted to provide radiation with a predetermined attribute or with an attribute selected from a predetermined group of attributes, the attribute being at least one of a property and characteristic of the radiation.

3. A system according to claim 1, wherein the radiation provider is adapted to emit radiation into the radiation transmissive element and onto the first surface, and wherein the radiation transmissive element is adapted to guide radiation from the radiation provider to the first surface.

4. A system according to claim 1, wherein the plurality of radiation emitters comprise:
   at least two scanning beam emitters, each of the at least two scanning beam emitters being configured to provide a scanning beam directing radiation toward the first surface from a different location.

5. A system according to claim 4, wherein the one or more detectors are positioned so as to be able to determine one or more points in time where the scanning beams emit radiation toward the one or more detectors, and wherein the touch controller is adapted to determine the position also on the basis of the one or more points in time.

6. A system according to claim 1, wherein the radiation provider is adapted to control the plurality of radiation emitters or groups of radiation emitters to, sequentially in a predetermined order, emit radiation with a predetermined variation in wavelength or intensity, and wherein the touch controller is adapted to determine the position on the basis of at least one of the wavelength and intensity variation and a point in time of detection of the variation.

7. A system according to claim 1, wherein the radiation provider is adapted to provide radiation with an attribute which is a variation in at least one of the amplitude and wavelength of the radiation, the variation being at least 50 Hz.

8. A system for determining a position of an element to at least one of scatter and reflect radiation, the system comprising:
   a radiation transmissive element having a first surface adapted to be engaged by the element and a second surface opposite to the first surface,
   a radiation provider adapted to provide radiation to or at the first surface in order for the element to be able to at least one of scatter and reflect radiation into the radiation transmissive element at the position on the first surface,
   one or more detectors for detecting radiation that is at least one of scattered and reflected, at the position at the first surface, into the radiation transmissive element and guided by the radiation transmissive element toward the one or more detectors and for outputting one or more corresponding signals,
   a touch controller configured to determine the position on the basis of the one or more corresponding signals from the one or more detectors, wherein
      the touch controller is adapted to determine the position on the basis of attributes of the radiation detected by the one or more detectors, the attributes including at least one of properties and characteristics of the radiation detected by the one or more detectors, and the radiation provider is adapted to provide radiation with different attributes to different portions of the first surface, at least one area of the first surface receiving radiation having at least two of the different attributes, the radiation provider including, a plurality of radiation emitters each adapted to emit radiation through the second surface and onto the first surface, each radiation emitter or group of radiation emitters being controllable independently of other emitters or groups of emitters, and wherein the radiation provider is adapted to control the emitters so as to provide, through the second surface and onto the first surface of the radiation transmissive element, radiation representing a predetermined image, and wherein the radiation provider is further adapted to alter the emission of one or more radiation emitters by addition or subtraction of a predetermined intensity or wavelength, the touch controller being adapted to determine the position as a position in which the intensity or wavelength has been altered.

9. A system according to claim 8, wherein the radiation provider is adapted to sequentially alter the emission of different groups of emitters.

10. A system for determining a position of an element to at least one of scatter and reflect radiation, the system comprising:

a radiation transmissive element having a first surface adapted to be engaged by the element and a second surface opposite to the first surface, a radiation provider adapted to provide radiation to or at the first surface in order for the element to be able to at least one of scatter and reflect radiation into the radiation transmissive element at the position on the first surface, one or more detectors for detecting radiation that is at least one of scattered and reflected, at the position at the first surface, into the radiation transmissive element and guided by the radiation transmissive element toward the one or more detectors and for outputting one or more corresponding signals, a touch controller configured to determine the position on the basis of the one or more corresponding signals from the one or more detectors, wherein the radiation provider is adapted to provide radiation with different attributes to different portions of the first surface, at least one area of the first surface receiving radiation having at least two of the different attributes, the attributes including at least one of properties and characteristics of the radiation, the touch controller is adapted to determine the position on the basis of attributes of the radiation detected by the one or more detectors, and the touch controller is adapted to, determine a first position of a first element to at least one of scatter and reflect radiation, the first element engaging the first surface and a second position of a second element to at least one of scatter and reflect radiation, the second element engaging the first surface, and control the radiation provider to provide first radiation at or on the first position and second radiation at or on the second position, the first radiation having a first attribute or an attribute selected from a first group of attributes, and the second radiation having a second attribute or an attribute selected from a second group of attributes, the first and second attributes being different and the first and second groups of attributes having no attribute in common, track the first position on the basis of signals from the one or more detectors and relating to radiation having the first attribute or radiation having an attribute from the first group, and track the second position on the basis of signals from the one or more detectors and relating to radiation having the second attribute or radiation having an attribute from the second group.

11. A method for determining a position of an element to at least one of scatter and reflect radiation, the method comprising:

providing, from a radiation provider, radiation to or at a first surface of a radiation transmissive element, the first surface being adapted to be engaged by the element, and the radiation transmissive element having a second surface opposite to the first surface, the element at least one of scattering and reflecting radiation, at the position, from the radiation provider into the radiation transmissive element at the position on the first surface, detecting radiation at least one of scattered and reflected by the element and guided by the radiation transmissive element toward one or more detectors and providing one or more corresponding signals, determining the position on the basis of the one or more corresponding signals, wherein the radiation providing step comprises, providing radiation with different attributes to different portions of the first surface and providing radiation having at least two of the different attributes to at least one area, and providing each radiation emitter with a radiation altering element, all radiation altering elements receiving radiation from one or more radiation emitters providing radiation to a plurality of radiation altering elements, wherein the determining step comprises, determining the position on the basis of the attributes of the radiation detected, wherein each radiation emitter emits radiation through the second surface and onto the first surface, wherein each radiation emitter or group of radiation emitters are controlled independently of other emitters or groups of emitters, wherein each radiation emitter provides radiation to a plurality of radiation altering elements, no radiation altering elements receive radiation from more than one radiation emitter, and wherein properties of the radiation emitters are controlled independently of radiation altering properties of the individual radiation altering elements.

12. A method according to claim 11, wherein the radiation providing step comprises:

each of the radiation emitters providing radiation to a predetermined portion of the first surface and each providing radiation with a predetermined attribute or with an attribute selected from a predetermined group of properties.

13. A method according to claim 11, wherein the radiation providing step comprises:

providing at least two scanning beams directing radiation toward the first surface from different locations.

14. A method according to claim 13, wherein the detecting step comprises:
   determining one or more points in time where the scanning beams emit radiation toward the one or more detectors, and wherein the determining step comprises,
   determining the position also on the basis of the one or more points in time.

15. A method according to claim 11, wherein the radiation provider emits radiation into the radiation transmissive element and onto the first surface, and wherein the radiation transmissive element guides radiation from the radiation provider to the first surface.

16. A method according to claim 11, wherein the radiation providing step comprises:
   the radiation emitters or groups of radiation emitters emitting, sequentially in a predetermined order, radiation with a predetermined variation in wavelength or intensity, and wherein the determination step comprises,
   determining the position on the basis of at least one of a wavelength and intensity variation and a point in time of detection of the variation.

17. A method according to claim 11, wherein the radiation providing step comprises:
   providing radiation with an attribute which is a variation in at least one of an amplitude and a wavelength of the radiation, the variation being at least 50 Hz.

18. A method for determining a position of an element to at least one of scatter and reflect radiation, the method comprising:
   providing, from a radiation provider, radiation to or at a first surface of a radiation transmissive element, the first surface being adapted to be engaged by the element, and the radiation transmissive element having a second surface opposite to the first surface,
   the element at least one of scattering and reflecting radiation, at the position, from the radiation provider into the radiation transmissive element at the position on the first surface,
   detecting radiation that is at least one of scattered and reflected by the element and guided by the radiation transmissive element toward the one or more detectors and providing one or more corresponding signals,
   determining the position on the basis of the one or more corresponding signals,
   wherein the radiation providing step includes,
      providing radiation with different attributes to different portions of the first surface and providing radiation having at least two of the different attributes to at least one area, the attributes including at least one of properties and characteristics of the radiation,
      emitters providing, through the second surface and onto the first surface of the radiation transmissive element, radiation representing a predetermined image, and
      altering the emission of one or more of the emitters by addition or subtraction of a predetermined intensity or wavelength, and
   wherein the determining step includes,
      determining the position on the basis of attributes of the radiation detected, and
      determining the position as a position in which the intensity or wavelength has been altered.

19. A method according to claim 18, wherein the radiation providing step comprises:
   sequentially altering the emission of different groups of emitters.

20. A method for determining a position of an element to at least one of scatter and reflect radiation, the method comprising:
   providing, from a radiation provider, radiation to or at a first surface of a radiation transmissive element, the first surface being adapted to be engaged by the element, and the radiation transmissive element having a second surface opposite to the first surface,
   the element at least one of scattering and reflecting radiation, at the position, from the radiation provider into the radiation transmissive element at the position on the first surface,
   detecting radiation that is at least one of scattered and reflected by the element and guided by the radiation transmissive element toward one or more detectors and providing one or more corresponding signals,
   determining the position on the basis of the one or more corresponding signals,
   determining a first position of a first element to at least one of scatter and reflect radiation, and a second position of a second element to at least one of scatter and reflect radiation,
   providing first radiation at or on the first position and second radiation at or on the second position, the first radiation having a first attribute or an attribute selected from a first group of attributes, and the second radiation having a second attribute or an attribute selected from a second group of attributes, the first and second attributes being different and the first and second groups of attributes having no attribute in common,
   tracking the first position on the basis of one or more signals relating to detected radiation having the first attribute or radiation having an attribute from the first group, and
   tracking the second position on the basis of one or more signals relating to detected radiation having the second attribute or radiation having an attribute from the second group,
   wherein the radiation providing step includes providing radiation with different attributes to different portions of the first surface and providing radiation having at least two of the different attributes to at least one area, and
   wherein the determination step comprises determining the position on the basis of the attributes of the radiation detected.

21. A system for determining a position of an element to at least one of scatter and reflect radiation, the system comprising:
   a radiation transmissive element having a first surface adapted to be engaged by the element and a second surface opposite to the first surface,
   a monitor or display comprising a plurality of controllable radiation emitters each being adapted to provide radiation through the radiation transmissive element from the second surface toward a predetermined area of the first surface, the monitor or display being adapted to control the emitters to provide radiation representing predetermined images on the first surface,
   one or more detectors for detecting radiation emitted by the monitor or display, at least one of scattered and reflected, at the position of the first surface, into the radiation transmissive element and guided by the radiation transmissive element toward the one or more detectors and for outputting one or more corresponding signals,
   a controller configured to determine the position on the basis of the one or more corresponding signals from the one or more detectors, wherein the monitor or display is adapted to control predetermined radiation emitters or groups of radiation emitters to alter at least one of a wavelength and intensity of radiation emitted thereby in order for at least one of the wavelength and intensity of the emitters to deviate from that of an actual predetermined image, wherein the controller is adapted to determine the position as a position in which the at least one of the intensity and wavelength is altered in relation to that of the predetermined image, wherein the monitor or display is adapted to, sequentially, for each of a number of groups of radiation emitters, alter between providing the at least one of the wavelength and intensity of the predetermined image and the altered at least one of the intensity and wavelength, and wherein the controller is adapted to determine the position on the basis of,
- a point in time in which the altered at least one of the intensity and wavelength is detected,
- a group of radiation emitters having altered the at least one of the intensity and wavelength at that point in time, and
- an area of the first surface in which a radiation emitter of the group of radiation emitters is adapted to provide radiation.

22. A system according to claim 21, wherein the controller is adapted to determine the position on the basis of an initial determination of an area and a subsequent repetition of the process of:
1. performing a determination of:
   a. altering the radiation of the determined radiation emitters within the predetermined area,
   b. determining whether an altered at least one of intensity and wavelength is detected,
   c. if so, determining a reduced, predetermined area as a part of the predetermined area and repeating step 1 within the reduced, predetermined area,
   d. if not, repeating step 1 with an amended predetermined area being a last predetermined area within which an altered at least one of intensity and wavelength was detected subtracted the predetermined area of step a.

23. A system according to claim 21, wherein the monitor or display is adapted to control all groups of radiation emitters to alter the at least one of wavelength and intensity sequentially and in a predetermined order.

24. A system according to claim 23, wherein the monitor or display is adapted to control the radiation emitters to alter the at least one of wavelength and intensity of the radiation emitted thereby in an order so that the radiation, at the first surface, is altered sequentially along a predetermined direction in a plane of the first surface.

25. A system according to claim 24, wherein the monitor or display is adapted to alter the radiation of each radiation emitter in a predetermined manner and over a predetermined period of time.

26. A system according to claim 23, wherein the monitor or display is adapted to control the radiation emitters of the groups controlled to alter the radiation emitted thereby so that each of the radiation emitters of the group alters the at least one of wavelength and intensity in a different manner.

27. A system according to claim 21, wherein the monitor or display is adapted to control radiation emitters, adapted to provide radiation to a predetermined area at or around a predetermined position, to alter the at least one of wavelength and intensity of radiation emitted thereby in a predetermined manner.

28. A system according to claim 27, wherein the monitor or display is adapted to control different ones of the radiation emitters to alter the at least one of wavelength and intensity differently, and wherein the controller is adapted to determine the position on the basis of the actual altering of the at least one of wavelength and intensity detected.

29. A method for determining a position of a element to at least one of scatter and reflect radiation, the method comprising:

providing radiation through a radiation transmissive element, having a first surface adapted to be engaged by the element and a second surface opposite to the first surface, from the second surface toward a predetermined area of the first surface, the radiation being provided by a monitor or display comprising a plurality of controllable radiation emitters each providing radiation to a predetermined area of the first surface, the monitor or display controlling the emitters to provide radiation representing one or more predetermined images on the first surface, detecting radiation emitted by the monitor or display, at least one of scattered and reflected by the element, at the position of the first surface, into the radiation transmissive element and guided by the radiation transmissive element toward one or more detectors, and providing one or more corresponding signals, and determining the position on the basis of the one or more corresponding signals from the one or more detectors, wherein the monitor or display controls predetermined radiation emitters or groups of radiation emitters to alter at least one of wavelength and intensity of radiation emitted thereby so that the at least one of wavelength and intensity of the emitters deviate from that of an actual predetermined image, wherein the position is determined as a position in which the at least one of wavelength and intensity is altered in relation to that of the predetermined image, wherein the radiation emitters of each of a number of groups of radiation emitters, sequentially alter between providing the at least one of wavelength and intensity of the predetermined image and the altered at least one of intensity and wavelength, and wherein the position is determined on the basis of,
- a point in time in which the altered at least one of intensity and wavelength is detected,
- a group of radiation emitters having altered the at least one of wavelength and intensity at that point in time, and
- an area of the first surface in which a radiation emitter of the group of radiation emitters is adapted to provide radiation.

30. A method according to claim 29, wherein the position is determined on the basis of an initially determined area and a subsequent repetition of the process of:
1. performing a determination of:
   a. altering the radiation of the radiation emitters within the predetermined area,
   b. determining whether an altered at least one of intensity and wavelength is detected,
   c. if so, determining a reduced, predetermined area as a part of the predetermined area and repeating step 1 within the reduced, predetermined area,
   d. if not, repeating step 1 with an amended predetermined area being the last predetermined area within which an altered at least one of intensity and wavelength was detected subtracted the predetermined area of step a.

31. A method according to claim 29, wherein all groups of radiation emitters alter the at least one of wavelength and intensity sequentially and in a predetermined order.

32. A method according to claim 31, wherein the radiation emitters alter the at least one of wavelength and intensity of the radiation emitted thereby in an order so that the radiation, at the first surface, is altered sequentially along a predetermined direction in a plane of the first surface.

33. A method according to claim 31, wherein the monitor or display is adapted to control the radiation emitters of the groups controlled to alter the radiation emitted thereby so that each of the radiation emitters of the group alters the at least one of intensity and wavelength in a different manner.

34. A method according to claim 33, wherein the radiation of each radiation emitter in each group is altered in a predetermined manner and over a predetermined period of time.

35. A method according to claim 29, wherein radiation emitters providing radiation to a predetermined area at or around a predetermined position emit radiation with at least one of wavelength and intensity altered in a predetermined manner.

36. A method according to claim 35, wherein different ones of the radiation emitters emit radiation with differently altered at least one of wavelength and intensity, and wherein the position is determined on the basis of the actual altering of the at least one of wavelength and intensity detected.

* * * * *